US009007785B2

(12) United States Patent
Kosaka

(10) Patent No.: US 9,007,785 B2
(45) Date of Patent: Apr. 14, 2015

(54) POWER SUPPLY, IMAGE FORMING DEVICE, AND PIEZOELECTRIC TRANSDUCER CONTROL METHOD

(75) Inventor: Toru Kosaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 256 days.

(21) Appl. No.: 13/527,019

(22) Filed: Jun. 19, 2012

(65) Prior Publication Data

US 2012/0327689 A1 Dec. 27, 2012

(30) Foreign Application Priority Data

Jun. 22, 2011 (JP) ................................ 2011-138498

(51) Int. Cl.
*H02M 3/335* (2006.01)
*G03G 15/00* (2006.01)

(52) U.S. Cl.
CPC ..................................... *G03G 15/80* (2013.01)

(58) Field of Classification Search
None
See application file for complete search history.

(56) References Cited

U.S. PATENT DOCUMENTS 6,486,612 B2 * 11/2002 Fujimura et al. .............. 315/225
6,794,796 B2 * 9/2004 Nakatsuka et al. ...... 310/316.01
8,659,921 B2 * 2/2014 Buchwald et al. .............. 363/75
2007/0007855 A1 1/2007 Murata et al.
2010/0104313 A1 * 4/2010 Kosaka et al. .................. 399/88
2010/0188011 A1 * 7/2010 Kosaka et al. ................ 315/276
2010/0202794 A1 * 8/2010 Kosaka et al. .................. 399/88
2011/0097100 A1 4/2011 Nagasaki
2011/0188878 A1 * 8/2011 Watanabe et al. ............... 399/88

FOREIGN PATENT DOCUMENTS

JP 56-61699 A 5/1981
JP 2007-189880 A 7/2007
JP 2008-224778 A 9/2008
JP 2010-148321 A 7/2010
JP 2010-172180 A 8/2010
JP 2011-097699 A 5/2011

* cited by examiner

*Primary Examiner* — Jue Zhang
*Assistant Examiner* — Monica Mata
(74) *Attorney, Agent, or Firm* — Rabin & Berdo, P.C.

(57) ABSTRACT

A power supply with a digital control circuit generates an output voltage by driving a piezoelectric transducer with an alternating current voltage at a digitally controlled driving frequency. To skip over a spurious frequency, the driving frequency is switched between a first range above the spurious frequency and a second range below the spurious frequency. Within the first and second ranges, the driving frequency is varied in directions that make the output voltage track a target voltage. If the driving frequency arrives at the lower limit of the first range, it jumps to a switchover frequency in the second range. The first range can be used to generate a comparatively low output voltage, and the second range to generate a comparatively high output voltage.

18 Claims, 20 Drawing Sheets

FIG. 10

TABLE REGISTER: INPUT AND OUTPUT VALUES

| INPUT VALUE: 8 BITS | OUTPUT VALUE: 8 BITS | INTEGER PART OF FDR | INPUT VALUE: 8 BITS | OUTPUT VALUE: 8 BITS | INTEGER PART OF FDR | INPUT VALUE: 8 BITS | OUTPUT VALUE: 8 BITS | INTEGER PART OF FDR | INPUT VALUE: 8 BITS | OUTPUT VALUE: 8 BITS | INTEGER PART OF FDR | INPUT VALUE: 8 BITS | OUTPUT VALUE: 8 BITS | INTEGER PART OF FDR |
|---|---|---|---|---|---|---|---|---|---|---|---|---|---|---|
| 00hex | FFhex | 100hex | 20hex | FFhex | 120hex | 40hex | FFhex | 140hex | 60hex | FFhex | 160hex | 80hex | FFhex | 180hex |
| 01hex | FFhex | 101hex | 21hex | FFhex | 121hex | 41hex | FFhex | 141hex | 61hex | FFhex | 161hex | 81hex | FFhex | 181hex |
| 02hex | FFhex | 102hex | 22hex | FFhex | 122hex | 42hex | FFhex | 142hex | 62hex | FFhex | 162hex | 82hex | FFhex | 182hex |
| 03hex | FFhex | 103hex | 23hex | FFhex | 123hex | 43hex | FFhex | 143hex | 63hex | FFhex | 163hex | 83hex | FFhex | 183hex |
| 04hex | FFhex | 104hex | 24hex | FFhex | 124hex | 44hex | FFhex | 144hex | 64hex | FFhex | 164hex | 84hex | FFhex | 184hex |
| 05hex | FFhex | 105hex | 25hex | FFhex | 125hex | 45hex | FFhex | 145hex | 65hex | FFhex | 165hex | 85hex | FFhex | 185hex |
| 06hex | FFhex | 106hex | 26hex | FFhex | 126hex | 46hex | FFhex | 146hex | 66hex | FFhex | 166hex | 86hex | FFhex | 186hex |
| 07hex | FFhex | 107hex | 27hex | FFhex | 127hex | 47hex | FFhex | 147hex | 67hex | FFhex | 167hex | 87hex | FFhex | 187hex |
| 08hex | FFhex | 108hex | 28hex | FFhex | 128hex | 48hex | FFhex | 148hex | 68hex | FFhex | 168hex | 88hex | FFhex | 188hex |
| 09hex | FFhex | 109hex | 29hex | FFhex | 129hex | 49hex | FFhex | 149hex | 69hex | FFhex | 169hex | 89hex | FFhex | 189hex |
| 0Ahex | FFhex | 10Ahex | 2Ahex | FFhex | 12Ahex | 4Ahex | FFhex | 14Ahex | 6Ahex | FFhex | 16Ahex | 8Ahex | FFhex | 18Ahex |
| 0Bhex | FFhex | 10Bhex | 2Bhex | FFhex | 12Bhex | 4Bhex | FFhex | 14Bhex | 6Bhex | FFhex | 16Bhex | 8Bhex | FFhex | 18Bhex |
| 0Chex | FFhex | 10Chex | 2Chex | FFhex | 12Chex | 4Chex | FFhex | 14Chex | 6Chex | FFhex | 16Chex | 8Chex | FFhex | 18Chex |
| 0Dhex | FFhex | 10Dhex | 2Dhex | FFhex | 12Dhex | 4Dhex | FFhex | 14Dhex | 6Dhex | FFhex | 16Dhex | 8Dhex | FFhex | 18Dhex |
| 0Ehex | FFhex | 10Ehex | 2Ehex | FFhex | 12Ehex | 4Ehex | FFhex | 14Ehex | 6Ehex | FFhex | 16Ehex | 8Ehex | FFhex | 18Ehex |
| 0Fhex | FFhex | 10Fhex | 2Fhex | FFhex | 12Fhex | 4Fhex | FFhex | 14Fhex | 6Fhex | FFhex | 16Fhex | 8Fhex | FFhex | 18Fhex |
| 10hex | FFhex | 110hex | 30hex | FFhex | 130hex | 50hex | FFhex | 150hex | 70hex | FFhex | 170hex | 90hex | 80hex | 190hex |
| 11hex | FFhex | 111hex | 31hex | FFhex | 131hex | 51hex | FFhex | 151hex | 71hex | FFhex | 171hex | 91hex | 7Chex | 191hex |
| 12hex | FFhex | 112hex | 32hex | FFhex | 132hex | 52hex | FFhex | 152hex | 72hex | FFhex | 172hex | 92hex | 78hex | 192hex |
| 13hex | FFhex | 113hex | 33hex | FFhex | 133hex | 53hex | FFhex | 153hex | 73hex | FFhex | 173hex | 93hex | 74hex | 193hex |
| 14hex | FFhex | 114hex | 34hex | FFhex | 134hex | 54hex | FFhex | 154hex | 74hex | FFhex | 174hex | 94hex | 70hex | 194hex |
| 15hex | FFhex | 115hex | 35hex | FFhex | 135hex | 55hex | FFhex | 155hex | 75hex | FFhex | 175hex | 95hex | 6Chex | 195hex |
| 16hex | E0hex | 116hex | 36hex | FFhex | 136hex | 56hex | FFhex | 156hex | 76hex | FFhex | 176hex | 96hex | 68hex | 196hex |
| 17hex | C0hex | 117hex | 37hex | FFhex | 137hex | 57hex | FFhex | 157hex | 77hex | FFhex | 177hex | 97hex | 64hex | 197hex |
| 18hex | A0hex | 118hex | 38hex | FFhex | 138hex | 58hex | FFhex | 158hex | 78hex | FFhex | 178hex | 98hex | 60hex | 198hex |
| 19hex | 80hex | 119hex | 39hex | FFhex | 139hex | 59hex | FFhex | 159hex | 79hex | FFhex | 179hex | 99hex | 5Chex | 199hex |
| 1Ahex | 40hex | 11Ahex | 3Ahex | FFhex | 13Ahex | 5Ahex | FFhex | 15Ahex | 7Ahex | FFhex | 17Ahex | 9Ahex | 58hex | 19Ahex |
| 1Bhex | 10hex | 11Bhex | 3Bhex | FFhex | 13Bhex | 5Bhex | FFhex | 15Bhex | 7Bhex | FFhex | 17Bhex | 9Bhex | 54hex | 19Bhex |
| 1Chex | 01hex | 11Chex | 3Chex | FFhex | 13Chex | 5Chex | FFhex | 15Chex | 7Chex | FFhex | 17Chex | 9Chex | 50hex | 19Chex |
| 1Dhex | FFhex | 11Dhex | 3Dhex | FFhex | 13Dhex | 5Dhex | FFhex | 15Dhex | 7Dhex | FFhex | 17Dhex | 9Dhex | 4Chex | 19Dhex |
| 1Ehex | FFhex | 11Ehex | 3Ehex | FFhex | 13Ehex | 5Ehex | FFhex | 15Ehex | 7Ehex | FFhex | 17Ehex | 9Ehex | 48hex | 19Ehex |
| 1Fhex | FFhex | 11Fhex | 3Fhex | FFhex | 13Fhex | 5Fhex | FFhex | 15Fhex | 7Fhex | FFhex | 17Fhex | 9Fhex | 44hex | 19Fhex |

FIG. 11

TABLE REGISTER: INPUT AND OUTPUT VALUES

| INPUT VALUE: 8 BITS | OUTPUT VALUE: 8 BITS | INTEGER PART OF FDR |
|---|---|---|
| A0hex | 40hex | 1A0hex |
| A1hex | 3Chex | 1A1hex |
| A2hex | 38hex | 1A2hex |
| A3hex | 34hex | 1A3hex |
| A4hex | 30hex | 1A4hex |
| A5hex | 2Chex | 1A5hex |
| A6hex | 28hex | 1A6hex |
| A7hex | 24hex | 1A7hex |
| A8hex | 20hex | 1A8hex |
| A9hex | 1Chex | 1A9hex |
| AAhex | 18hex | 1AAhex |
| ABhex | 14hex | 1ABhex |
| AChex | 10hex | 1AChex |
| ADhex | 0Chex | 1ADhex |
| AEhex | 08hex | 1AEhex |
| AFhex | 04hex | 1AFhex |
| B0hex | 02hex | 1B0hex |
| B1hex | 01hex | 1B1hex |
| B2hex | 01hex | 1B2hex |
| B3hex | 01hex | 1B3hex |
| B4hex | 01hex | 1B4hex |
| B5hex | 01hex | 1B5hex |
| B6hex | 01hex | 1B6hex |
| B7hex | 01hex | 1B7hex |
| B8hex | 01hex | 1B8hex |
| B9hex | 01hex | 1B9hex |
| BAhex | 01hex | 1BAhex |
| BBhex | 01hex | 1BBhex |
| BChex | 01hex | 1BChex |
| BDhex | 01hex | 1BDhex |
| BEhex | 01hex | 1BEhex |
| BFhex | 01hex | 1BFhex |

| INPUT VALUE: 8 BITS | OUTPUT VALUE: 8 BITS | INTEGER PART OF FDR |
|---|---|---|
| C0hex | 01hex | 1C0hex |
| C1hex | 01hex | 1C1hex |
| C2hex | 01hex | 1C2hex |
| C3hex | 01hex | 1C3hex |
| C4hex | 01hex | 1C4hex |
| C5hex | 01hex | 1C5hex |
| C6hex | 01hex | 1C6hex |
| C7hex | 01hex | 1C7hex |
| C8hex | 01hex | 1C8hex |
| C9hex | 01hex | 1C9hex |
| CAhex | 01hex | 1CAhex |
| CBhex | 01hex | 1CBhex |
| CChex | 01hex | 1CChex |
| CDhex | 01hex | 1CDhex |
| CEhex | 01hex | 1CEhex |
| CFhex | 01hex | 1CFhex |
| D0hex | FFhex | 1D0hex |
| D1hex | FFhex | 1D1hex |
| D2hex | FFhex | 1D2hex |
| D3hex | FFhex | 1D3hex |
| D4hex | FFhex | 1D4hex |
| D5hex | FFhex | 1D5hex |
| D6hex | FFhex | 1D6hex |
| D7hex | FFhex | 1D7hex |
| D8hex | FFhex | 1D8hex |
| D9hex | FFhex | 1D9hex |
| DAhex | FFhex | 1DAhex |
| DBhex | FFhex | 1DBhex |
| DChex | FFhex | 1DChex |
| DDhex | FFhex | 1DDhex |
| DEhex | FFhex | 1DEhex |
| DFhex | FFhex | 1DFhex |

| INPUT VALUE: 8 BITS | OUTPUT VALUE: 8 BITS | INTEGER PART OF FDR |
|---|---|---|
| E0hex | FFhex | 1E0hex |
| E1hex | FFhex | 1E1hex |
| E2hex | FFhex | 1E2hex |
| E3hex | FFhex | 1E3hex |
| E4hex | FFhex | 1E4hex |
| E5hex | FFhex | 1E5hex |
| E6hex | FFhex | 1E6hex |
| E7hex | FFhex | 1E7hex |
| E8hex | FFhex | 1E8hex |
| E9hex | FFhex | 1E9hex |
| EAhex | FFhex | 1EAhex |
| EBhex | FFhex | 1EBhex |
| EChex | FFhex | 1EChex |
| EDhex | FFhex | 1EDhex |
| EEhex | FFhex | 1EEhex |
| EFhex | FFhex | 1EFhex |
| F0hex | FFhex | 1F0hex |
| F1hex | FFhex | 1F1hex |
| F2hex | FFhex | 1F2hex |
| F3hex | FFhex | 1F3hex |
| F4hex | FFhex | 1F4hex |
| F5hex | FFhex | 1F5hex |
| F6hex | FFhex | 1F6hex |
| F7hex | FFhex | 1F7hex |
| F8hex | FFhex | 1F8hex |
| F9hex | FFhex | 1F9hex |
| FAhex | FFhex | 1FAhex |
| FBhex | FFhex | 1FBhex |
| FChex | FFhex | 1FChex |
| FDhex | FFhex | 1FDhex |
| FEhex | FFhex | 1FEhex |
| FFhex | FFhex | 1FFhex |

FIG. 12

RELATIONSHIP BETWEEN DRIVING FREQUENCY AND OUTPUT

| INTEGER PART OF FDR | FREQUENCY (kHz) | OUTPUT VOLTAGE (Volts) |
|---|---|---|
| 116hex | 179.86 | 25 |
| 117hex | 179.21 | 35 |
| 118hex | 178.57 | 40 |
| 119hex | 177.94 | 55 |
| 11Ahex | 177.30 | 130 |
| 11Bhex | 176.68 | 270 |
| 11Chex | 176.06 | 570 |
| 11Dhex | 175.44 | 1380 |
| 11Ehex | 174.83 | 1920 |
| 11Fhex | 174.22 | 1030 |
| 120hex | 173.61 | 490 |
| 121hex | 173.01 | 275 |
| 122hex | 172.41 | 210 |
| 123hex | 171.82 | 175 |
| 124hex | 171.23 | 155 |
| 125hex | 170.65 | 145 |
| 126hex | 170.07 | 135 |
| 127hex | 169.49 | 130 |
| 128hex | 168.92 | 125 |
| 129hex | 168.35 | 120 |
| 12Ahex | 167.79 | 115 |
| 12Bhex | 167.22 | 110 |
| 12Chex | 166.67 | 105 |
| 12Dhex | 166.11 | 100 |
| 12Ehex | 165.56 | 95 |
| 12Fhex | 165.02 | 95 |
| 130hex | 164.47 | 90 |
| 131hex | 163.93 | 90 |
| 132hex | 163.40 | 85 |
| 133hex | 162.87 | 85 |
| 134hex | 162.34 | 85 |
| 135hex | 161.81 | 85 |

| INTEGER PART OF FDR | FREQUENCY (kHz) | OUTPUT VOLTAGE (Volts) |
|---|---|---|
| 136hex | 161.29 | 90 |
| 137hex | 160.77 | 90 |
| 138hex | 160.26 | 90 |
| 139hex | 159.74 | 90 |
| 13Ahex | 159.24 | 90 |
| 13Bhex | 158.73 | 95 |
| 13Chex | 158.23 | 95 |
| 13Dhex | 157.73 | 95 |
| 13Ehex | 157.23 | 95 |
| 13Fhex | 156.74 | 100 |
| 140hex | 156.25 | 100 |
| 141hex | 155.76 | 100 |
| 142hex | 155.28 | 100 |
| 143hex | 154.80 | 100 |
| 144hex | 154.32 | 105 |
| 145hex | 153.85 | 105 |
| 146hex | 153.37 | 110 |
| 147hex | 152.91 | 110 |
| 148hex | 152.44 | 110 |
| 149hex | 151.98 | 110 |
| 14Ahex | 151.52 | 115 |
| 14Bhex | 151.06 | 115 |
| 14Chex | 150.60 | 115 |
| 14Dhex | 150.15 | 120 |
| 14Ehex | 149.70 | 120 |
| 14Fhex | 149.25 | 120 |
| 150hex | 148.81 | 125 |
| 151hex | 148.37 | 125 |
| 152hex | 147.93 | 125 |
| 153hex | 147.49 | 130 |
| 154hex | 147.06 | 130 |
| 155hex | 146.63 | 130 |

| INTEGER PART OF FDR | FREQUENCY (kHz) | OUTPUT VOLTAGE (Volts) |
|---|---|---|
| 156hex | 146.20 | 135 |
| 157hex | 145.77 | 135 |
| 158hex | 145.35 | 135 |
| 159hex | 144.93 | 140 |
| 15Ahex | 144.51 | 140 |
| 15Bhex | 144.09 | 145 |
| 15Chex | 143.68 | 145 |
| 15Dhex | 143.27 | 150 |
| 15Ehex | 142.86 | 150 |
| 15Fhex | 142.45 | 155 |
| 160hex | 142.05 | 155 |
| 161hex | 141.64 | 160 |
| 162hex | 141.24 | 160 |
| 163hex | 140.85 | 160 |
| 164hex | 140.45 | 165 |
| 165hex | 140.06 | 165 |
| 166hex | 139.66 | 170 |
| 167hex | 139.28 | 175 |
| 168hex | 138.89 | 180 |
| 169hex | 138.50 | 185 |
| 16Ahex | 138.12 | 190 |
| 16Bhex | 137.74 | 195 |
| 16Chex | 137.36 | 200 |
| 16Dhex | 136.99 | 205 |
| 16Ehex | 136.61 | 205 |
| 16Fhex | 136.24 | 210 |
| 170hex | 135.87 | 220 |
| 171hex | 135.50 | 225 |
| 172hex | 135.14 | 230 |
| 173hex | 134.77 | 240 |
| 174hex | 134.41 | 245 |
| 175hex | 134.05 | 260 |

| INTEGER PART OF FDR | FREQUENCY (kHz) | OUTPUT VOLTAGE (Volts) |
|---|---|---|
| 176hex | 133.69 | 295 |
| 177hex | 133.33 | 370 |
| 178hex | 132.98 | 430 |
| 179hex | 132.63 | 310 |
| 17Ahex | 132.28 | 295 |
| 17Bhex | 131.93 | 295 |
| 17Chex | 131.58 | 300 |
| 17Dhex | 131.23 | 300 |
| 17Ehex | 130.89 | 305 |
| 17Fhex | 130.55 | 310 |
| 180hex | 130.21 | 310 |
| 181hex | 129.87 | 315 |
| 182hex | 129.53 | 320 |
| 183hex | 129.20 | 325 |
| 184hex | 128.87 | 330 |
| 185hex | 128.53 | 340 |
| 186hex | 128.21 | 345 |
| 187hex | 127.88 | 355 |
| 188hex | 127.55 | 365 |
| 189hex | 127.23 | 375 |
| 18Ahex | 126.90 | 385 |
| 18Bhex | 126.58 | 390 |
| 18Chex | 126.26 | 400 |
| 18Dhex | 125.94 | 415 |
| 18Ehex | 125.63 | 420 |
| 18Fhex | 125.31 | 440 |
| 190hex | 125.00 | 450 |
| 191hex | 124.69 | 470 |
| 192hex | 124.38 | 480 |
| 193hex | 124.07 | 500 |
| 194hex | 123.76 | 510 |
| 195hex | 123.46 | 535 |

FIG. 13

RELATIONSHIP BETWEEN DRIVING FREQUENCY AND OUTPUT

| INTEGER PART OF FDR | FREQ-UENCY (kHz) | OUTPUT VOLTAGE (Volts) |
|---|---|---|
| 196hex | 123.15 | 545 |
| 197hex | 122.85 | 565 |
| 198hex | 122.55 | 585 |
| 199hex | 122.25 | 600 |
| 19Ahex | 121.95 | 610 |
| 19Bhex | 121.65 | 630 |
| 19Chex | 121.36 | 640 |
| 19Dhex | 121.07 | 670 |
| 19Ehex | 120.77 | 690 |
| 19Fhex | 120.48 | 710 |
| 1A0hex | 120.19 | 730 |
| 1A1hex | 119.90 | 760 |
| 1A2hex | 119.62 | 780 |
| 1A3hex | 119.33 | 830 |
| 1A4hex | 119.05 | 850 |
| 1A5hex | 118.76 | 880 |
| 1A6hex | 118.48 | 930 |
| 1A7hex | 118.20 | 960 |
| 1A8hex | 117.92 | 1000 |
| 1A9hex | 117.65 | 1040 |
| 1AAhex | 117.37 | 1090 |
| 1ABhex | 117.10 | 1160 |
| 1AChex | 116.82 | 1210 |
| 1ADhex | 116.55 | 1280 |
| 1AEhex | 116.28 | 1360 |
| 1AFhex | 116.01 | 1430 |
| 1B0hex | 115.74 | 1520 |
| 1B1hex | 115.47 | 1640 |
| 1B2hex | 115.21 | 1770 |
| 1B3hex | 114.94 | 1900 |
| 1B4hex | 114.68 | 2030 |
| 1B5hex | 114.42 | 2140 |

| INTEGER PART OF FDR | FREQ-UENCY (kHz) | OUTPUT VOLTAGE (Volts) |
|---|---|---|
| 1B6hex | 114.16 | 2300 |
| 1B7hex | 113.90 | 2470 |
| 1B8hex | 113.64 | 2610 |
| 1B9hex | 113.38 | 2800 |
| 1BAhex | 113.12 | 3080 |
| 1BBhex | 112.87 | 3390 |
| 1BChex | 112.61 | 3710 |
| 1BDhex | 112.36 | 4080 |
| 1BEhex | 112.11 | 4540 |
| 1BFhex | 111.86 | 5000 |
| 1C0hex | 111.61 | 5400 |
| 1C1hex | 111.36 | 5860 |
| 1C2hex | 111.11 | 6360 |
| 1C3hex | 110.86 | 6810 |
| 1C4hex | 110.62 | 7270 |
| 1C5hex | 110.38 | 7730 |
| 1C6hex | 110.13 | 8210 |
| 1C7hex | 109.89 | 8710 |
| 1C8hex | 109.65 | 8880 |
| 1C9hex | 109.41 | 9000 |
| 1CAhex | 109.17 | 9080 |
| 1CBhex | 108.93 | 9120 |
| 1CChex | 108.70 | 8750 |
| 1CDhex | 108.46 | 2000 |
| 1CEhex | 108.23 | 800 |
| 1CFhex | 107.99 | 400 |

POWER SUPPLY, IMAGE FORMING DEVICE, AND PIEZOELECTRIC TRANSDUCER CONTROL METHOD

BACKGROUND OF THE INVENTION

1. Field of the Invention

The present invention relates to a power supply that generates a voltage by driving a piezoelectric transducer, to an image forming device including the power supply, and to a method of controlling the piezoelectric transducer.

2. Description of the Related Art

A piezoelectric transducer (a piezoelectric resonator such as a ceramic plate, for example) can function as a voltage converter that converts an input alternating current (ac) voltage to a boosted output voltage. Such piezoelectric transducers are widely used in the power supplies of image forming devices to generate, for example, driving voltages for cold cathode tubes in liquid crystal displays, or voltages supplied to the transfer and developing rollers in electrophotographic devices. The output characteristics (resonance characteristics) of piezoelectric transducers vary with factors such as the load impedance, e.g., the impedance of the cold cathode tube or transfer roller. To stabilize the output voltage, it is necessary to control the frequency of the ac voltage supplied to the piezoelectric transducer (the driving frequency) according to load impedance variations and other factors. Control of the driving frequency can be implemented by an analog circuit such as a voltage controlled oscillator (VCO). A power supply unit using a VCO is disclosed by Uchiyama et al. in Japanese Patent Application Publication No. 2007-189880.

A problem with the power supply disclosed in Japanese Patent Application Publication No. 2007-189880 is that since it uses analog control of the driving frequency, it has a large number of analog circuit components. Another problem is that the piezoelectric transducer has resonant frequencies (referred to below as spurious frequencies) other than the natural resonant frequency used for voltage boosting, and generates excessive heat when driven at or near a spurious frequency. To avoid overheating, it is desirable to control the driving frequency so as to avoid these spurious frequencies, but it is difficult to configure an analog control circuit for a VCO to avoid such spurious frequencies in a flexible way.

A recently proposed solution to these problems is to use a digital circuit to control the driving frequency. In Japanese Patent Application Publication No. 2010-148321, for example, Kosake et al. disclose a power supply apparatus using digital control of the driving frequency of the piezoelectric transducer and an image forming device including the power supply apparatus.

The disclosed power supply apparatus sets a starting frequency fstart between the spurious frequencies and the resonant frequency f0, (f0<fstart<spurious frequencies), and avoids the spurious frequencies by keeping the driving frequency between the starting frequency fstart and the resonant frequency f0.

These conventional power supplies, however, are problematic in that their starting output voltages are not low enough. More specifically, the absolute values of their starting output voltages are not low enough to be used for warmup purposes in electrophotographic image forming devices. Warmup is necessary because the voltage boosting ratio of a piezoelectric transducer (the ratio of its output voltage amplitude to its input voltage amplitude) is temperature dependent. The ratio is low at low temperatures, so for a while after the image forming device is powered on, the piezoelectric transducer may need to be warmed up by driving it in an idling mode, to raise its temperature and stabilize its input-output characteristic. If the output voltage generated during the warmup period is supplied to a transfer roller, however, the transfer roller draws residual toner from the surface of the facing photosensitive drum onto the transport belt. The residual toner is then removed from the transport belt by a cleaning device and accumulates in a collection receptacle. The higher the output voltage is during the warmup period, the faster the collection receptacle fills up and the more often it has to be replaced. This raises a problem in terms of environment-friendly product design, a topic of concern in recent years.

SUMMARY OF THE INVENTION

An object of the present invention is to provide a power supply, an image forming device, and a method of controlling a piezoelectric transducer that, while avoiding spurious frequencies of the piezoelectric transducer, can also use the piezoelectric transducer to generate both adequately high and adequately low output voltages.

In one aspect, the invention provides a power supply that uses a piezoelectric transducer having a prescribed resonant frequency and at least one spurious frequency higher than the prescribed resonant frequency to convert an input alternating current voltage to a converted voltage. A driving circuit generates the alternating current voltage input to the piezoelectric transducer. A voltage output unit generates an output voltage from the converted voltage. A voltage detection unit detects the output voltage and outputs the detected voltage value. A frequency control unit controls the driving frequency of the driving circuit by performing a digital operation on the detected voltage value. The frequency control unit varies the driving frequency in a first frequency range higher than the spurious frequency and a second frequency range between the spurious frequency and the prescribed resonant frequency to make the output voltage track a target voltage. When the driving frequency reaches the lower limit of the first frequency range, the frequency control unit changes the driving frequency from the first frequency range to a first switchover frequency in the second frequency range, thereby skipping over a prescribed frequency range including the spurious frequency.

In another aspect, the invention provides an image forming device including an image forming unit and the above power supply, which supplies an output voltage to the image forming unit.

In a further aspect, the invention provides a method of controlling a piezoelectric transducer that converts an input alternating current voltage to a converted voltage in a power supply. The piezoelectric transducer has a prescribed resonant frequency and at least one spurious frequency higher than the prescribed resonant frequency. The power supply includes the piezoelectric transducer, a driving circuit for generating the alternating current voltage input to the piezoelectric transducer, a voltage output unit for generating an output voltage from the converted voltage, a voltage detection unit for detecting the output voltage and outputting a detected voltage value, and a frequency control unit for controlling the driving frequency by performing a digital operation on the detected voltage value. The method includes the steps of:

varying the driving frequency in a first frequency range higher than the spurious frequency and a second frequency range between the spurious frequency and the prescribed resonant frequency in directions that make the output voltage track a target voltage;

deciding whether or not the driving frequency has reached a lower limit of the first frequency range; and changing the driving frequency from the first frequency range to a switchover frequency in the second frequency range when the driving frequency reaches the lower limit of the first frequency range, thereby skipping over a prescribed frequency range including the spurious frequency.

The piezoelectric transducer can generate a comparatively low output voltage when driven in the first frequency range and a comparatively high output voltage when driven in the second frequency range. Spurious frequencies located between the first and second frequency ranges are avoided by jumping between the two ranges.

BRIEF DESCRIPTION OF THE DRAWINGS

In the attached drawings:

FIGS. 10 and 11 list input and output values of the table register in FIG. 5 and the corresponding frequency division ratios;

FIGS. 12 and 13 list frequency division ratios and the corresponding driving frequencies and output voltages;

DETAILED DESCRIPTION OF THE INVENTION

Figure 1:
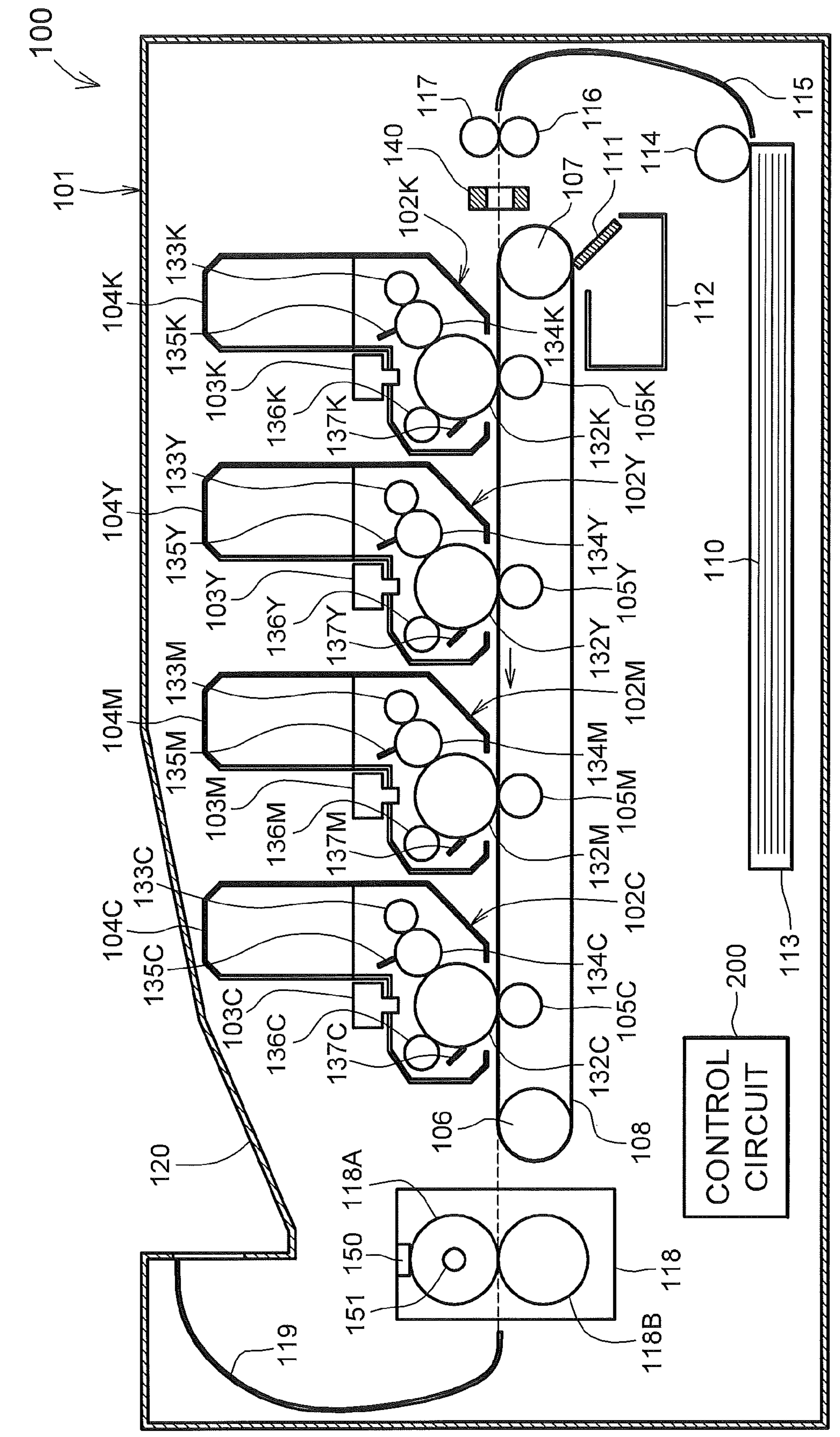
FIG. 1 schematically illustrates the structure of the image forming device in a first embodiment of the invention.

Embodiments of the invention will now be described with reference to the attached drawings, in which like elements are indicated by like reference characters.

First Embodiment

First the overall structure of the image forming device 100 in the first embodiment will be described with reference to FIG. 1.

As shown in FIG. 1, the image forming device 100 has a housing 101, a supply of recording media 110, a cassette 113 for holding the recording media 110, a hopping roller 114 for taking successive sheets of recording media 110 from the cassette 113, a guide 115 for guiding the sheets from the cassette 113 to a pair of registration rollers 116 and 117, a media sensor 140 for detecting the recording media 110, a transfer belt 108 on which the recording media 110 are placed and transported, developers (image forming units) 102K, 102Y, 102M, 102C for forming black, yellow, magenta, and cyan images, and toner (developing agent) cartridges 104K, 104Y, 104M, 104C removably attached to the respective developers 102K, 102Y, 102M, 102C. The toner cartridges 104K, 104Y, 104M, 104C respectively hold black, yellow, magenta, and cyan developing agents (toner).

The hopping roller 114 and the pair of registration rollers 116, 117 turn when driven by motors (not shown) and thereby send recording media 110 taken from the cassette 113 through the media sensor 140 and onto the transfer (or transport) belt 108 at prescribed timings. The media sensor 140 is a contacting or non-contacting sensor that detects the passage of the recording media 110 and sends a detection signal to a control circuit 200. The cassette 113 is removably mounted in the image forming device 100 and can hold a stack of sheets of recording media 110. The recording media 110 may be sheets of, for example, paper, synthetic paper, plastic film, cloth, or other materials.

The image forming device 100 also includes a driven roller 106 for driving the transfer belt 108, a non-driven roller 107 that turns together with the transfer belt 108, and transfer rollers 105K, 105Y, 105M, 105C respectively facing developers 102K, 102Y, 102M, 102C. The developers 102K, 102Y, 102M, 102C are disposed just above the transfer belt 108, following one another in the direction of travel of the transfer belt. The transfer belt 108 is looped around the driven roller 106 and non-driven roller 107. The driven roller 106 rotates counterclockwise when driven by a motor (not shown), thereby moving the transfer belt 108 and causing recording media 110 placed on the transfer belt 108 to pass beneath the developers 102K, 102Y, 102M, 102C and above the transfer rollers 105K, 105Y, 105M, 105C.

The developer 102K for black images includes a photosensitive drum 132K, a charging roller 136K for uniformly charging the surface of the photosensitive drum 132K, a light emitting diode (LED) head (exposure unit) 103K for forming an electrostatic latent image on the surface of the photosensitive drum 132K, a developing roller 134K functioning as a developing agent carrier, a developer blade 135K, a supply roller 133K for supplying the developing roller 134K with black developing agent from toner cartridge 104K, and a cleaning blade 137K. The developer blade 135K reduces the thickness of the developing agent layer (toner layer) on the surface of the developing roller 134K. When a portion of the surface of the photosensitive drum 132K reaches the developing roller 134K, because of the potential difference between the electrostatic latent image and the developing roller 134K, developing agent adheres to the photosensitive drum 132K, on which a developing agent image is thereby formed. The developing agent image on the photosensitive drum 132K is then transferred to the recording medium 110 by transfer roller 105K. This transfer is effected by a transfer bias voltage applied to transfer roller 105K, which pulls the developing agent onto the recording medium 110 by electrostatic attraction as the recording medium 110 travels through the nip between transfer roller 105K and the photosensitive drum 132K. The cleaning blade 137K removes residual developing agent, that was not transferred onto the recording medium 110, from the photosensitive drum 132K.

The other developers 102Y, 102M, 102C have the same structure as developer 102K. The developer 102Y for yellow images includes a photosensitive drum 132Y, a charging roller 136Y for uniformly charging the surface of photosensitive drum 132Y, an LED head (exposure unit) 103Y for forming an electrostatic latent image on the surface of photosensitive drum 132Y, a developing roller 134Y functioning as a developing agent carrier, a developer blade 135Y, a supply roller 133Y for supplying developing roller 134Y with yellow developing agent from toner cartridge 104Y, and a cleaning blade 137Y. The developer 102M for magenta images includes a photosensitive drum 132M, a charging roller 136M for uniformly charging the surface of photosensitive drum 132M, an LED head (exposure unit) 103M for forming an electrostatic latent image on the surface of photosensitive drum 132M, a developing roller 134M functioning as a developing agent carrier, a developer blade 135M, a supply roller 133M for supplying developing roller 134M with magenta developing agent from toner cartridge 104M, and a cleaning blade 137M. The developer 102C for cyan images includes a photosensitive drum 132C, a charging roller 136C for uniformly charging the surface of photosensitive drum 132C, an LED head (exposure unit) 103C for forming an electrostatic latent image on the surface of photosensitive drum 132C, a developing roller 134C functioning as a developing agent carrier, a developer blade 135C, a supply roller 133C for supplying developing roller 134C with cyan developing agent from toner cartridge 104C, and a cleaning blade 137C.

Each of the photosensitive drums 132K, 132Y, 132M, 132C includes a metal cylinder (conductive body), typically an aluminum cylinder, and a photoconductive layer, typically an organic photoconductor (OPC) layer, formed on the outer surface of the metal cylinder.

The image forming device 100 further includes a fuser 118 and a guide 119. The fuser 118 applies pressure and heat to the developing agent image transferred onto the recording media 110 and fuses the developing agent, thereby fixing it on the recording media 110. The fuser 118 includes a round cylindrical fusing roller 118A and a pressure roller 118B having an elastic surface layer. A fuser heater (heat source) 151 such as a halogen lamp is disposed in the fuser 118. A bias voltage is applied to the fuser heater 151 by a power source (not shown in this drawing). The thermistor 150 is a contacting or non-contacting temperature sensor, which detects the temperature of the surface of the fusing roller 118A and sends the detection result to the control circuit 200. Based on the temperature detected by the thermistor 150, the control circuit 200 controls the operation of the fuser heater 151 and accordingly the temperature of the fusing roller 118A. The guide 119 ejects the recording medium 110 discharged from the fuser 118 face down onto a tray 120 formed by the top surface of the image forming device 100.

The image forming device 100 also includes a cleaning blade 111 that removes developing agent (toner) from the surface of the transfer belt 108 and drops it into a collecting receptacle 112. The more developing agent reaches the surface of the transfer belt 108, the more often the collecting receptacle 112 must be replaced.

The control circuit 200 controls the overall operation of the image forming device 100. The schematic structure of the control circuit 200 will be described with reference to FIG. 2.

Figure 2:
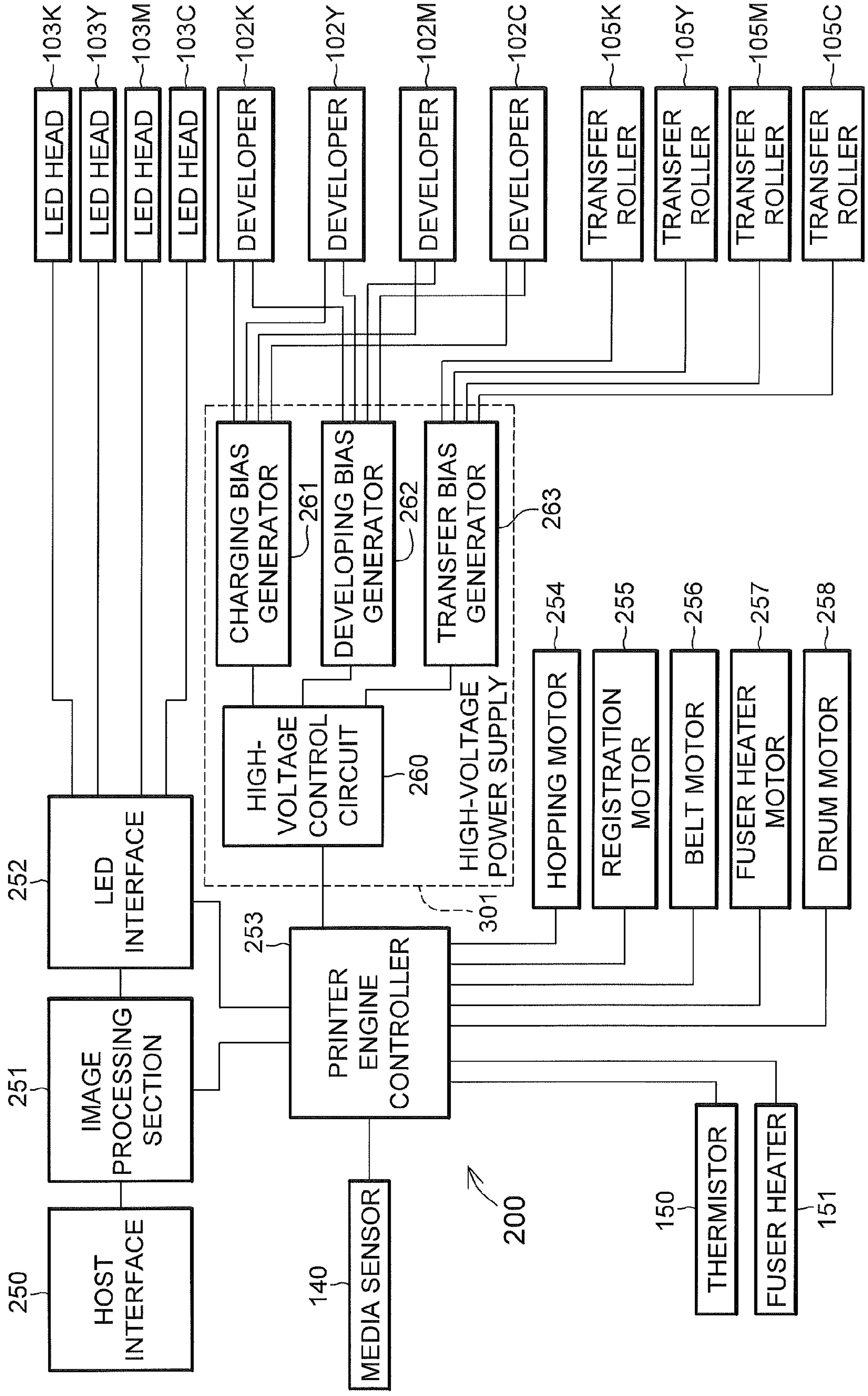
FIG. 2 is a functional block diagram illustrating the schematic structure of the control circuit in FIG. 1.

As shown in FIG. 2, the control circuit 200 includes a host interface 250, an image processing section 251, an LED interface 252, a printer engine controller 253, and a high-voltage power supply 301. The high-voltage power supply 301 includes a high-voltage control circuit 260, a charging bias generator 261, a developing bias generator 262, and a transfer bias generator 263, which generate direct current (dc) voltages referred to below as bias voltages or biases for the developers and transfer rollers.

The host interface 250 functions as a communication interface between an external host device (not shown) and the image processing section 251. When print data coded in a page description language (PDL) or other format are received from the host device via the host interface 250, the image processing section 251 generates corresponding bitmap data (image data) for black, yellow, magenta, and cyan images and outputs the bitmap data to the LED interface 252 and printer engine controller 253. The printer engine controller 253 sends control signals to the LED interface 252. Operating according to these control signals and the bitmap data, the LED interface 252 sends driving signals to the LED heads 103K, 103Y, 103M, 103C, causing them to emit light.

The printer engine controller 253 also outputs control signals to the high-voltage control circuit 260. These control signals are generated on the basis of the detection of recording media 110 by the media sensor 140, and specify, for example, the values of the charging, developing, and transfer bias voltages.

The charging bias generator 261, operating under control from the high-voltage control circuit 260, generates respective charging bias voltages for the charging rollers 136K, 136Y, 136M, 136C in the developers 102K, 102Y, 102M, 102C. The developing bias generator 262, also operating under control from the high-voltage control circuit 260, generates respective developing bias voltages for the developing rollers 134K, 134Y, 134M, 134C in the developers 102K, 102Y, 102M, 102C. The transfer bias generator 263, also operating under control from the high-voltage control circuit 260, generates respective transfer bias voltages for the transfer rollers 105K, 105Y, 105M, 105C. The high-voltage control circuit 260 controls the timings at which the transfer bias voltages are generated for each of the transfer rollers 105K, 105Y, 105M, 105C separately.

The printer engine controller 253 controls the operation of a hopping motor 254, registration motor 255, and belt motor 256, which turn the hopping roller 114, registration rollers 116 and 117, and driven roller 106 in FIG. 1. The printer engine controller 253 also controls the operation of a fuser heater motor 257, which generates a bias voltage that is supplied to the fuser heater 151, and the operation of the drum motor 258, which turns the photosensitive drums 132K, 132Y, 132M, 132C. The drum motor 258 includes separate rotational driving means for turning the photosensitive drums 132K, 132Y, 132M, 132C individually. The printer engine controller 253 controls the operation of the fuser heater 151 on the basis of the temperature detected by the thermistor 150.

Figure 3:
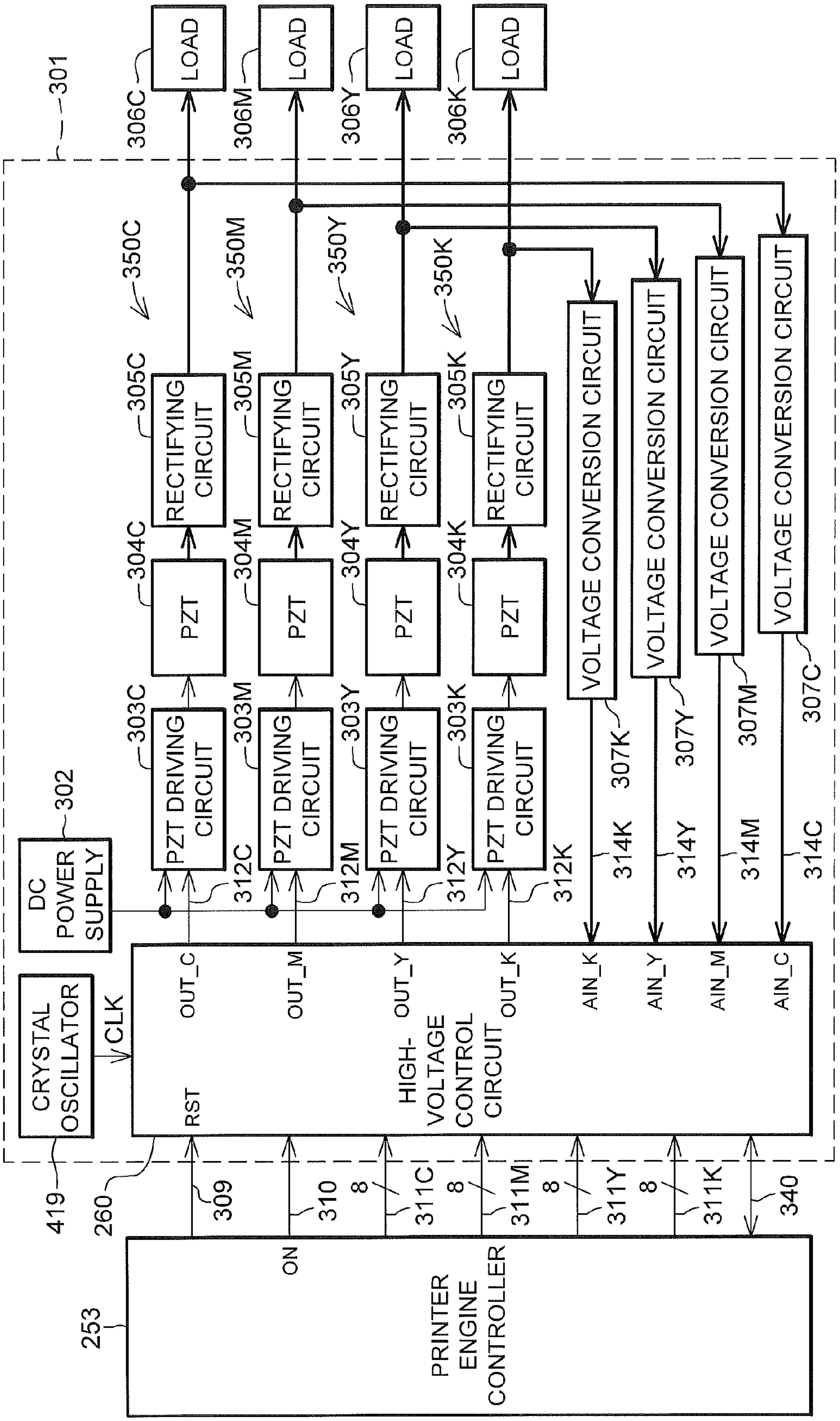
FIG. 3 is a functional block diagram illustrating a portion of the high-voltage power supply in FIG. 2.

FIG. 3 shows the structure of the high-voltage power supply 301 in more detail. Besides the high-voltage control circuit 260, the high-voltage power supply 301 includes a dc power supply (dc voltage supply) 302, transfer bias generator circuits 350K, 350Y, 350M, 350C, and a crystal oscillator 419. The transfer bias generator circuits 350K, 350Y, 350M, 350C constitute the transfer bias generator 263 in FIG. 2. For simplicity, the charging bias generator 261 and developing bias generator 262 in FIG. 2 are omitted from FIG. 3.

Transfer bias generator circuit 350K generates the transfer bias voltage supplied to a load 306K including the transfer roller 105K for black images; transfer bias generator circuit 350Y generates the transfer bias voltage supplied to a load 306Y including the transfer roller 105Y for yellow images; transfer bias generator circuit 350M generates the transfer bias voltage supplied to a load 306M including the transfer roller 105M for yellow images; transfer bias generator circuit 350C generates the transfer bias voltage supplied to a load 306C including the transfer roller 105C for cyan images. The transfer bias generator circuits 350K, 350Y, 350M, 350C use the dc voltage supplied from the dc power supply 302 to generate the transfer bias voltages responsive to driving pulses 312K, 312Y, 312M, 312C supplied from respective output terminals OUT_K, OUT_Y, OUT_M, OUT_C of the high-voltage control circuit 260.

The transfer bias generator circuit 350K for black images includes a piezoelectric transducer (PZT) 304K having a piezoelectric resonator such as a piezoelectric ceramic plate, a piezoelectric transducer driving circuit (PZT driving circuit) 303K that generates an ac voltage and supplies it to the primary electrode of the piezoelectric transducer 304K, a rectifying circuit 305K that rectifies the boosted voltage output from the secondary electrode of the piezoelectric transducer 304K, thereby generating a substantially dc bias voltage, and a voltage conversion circuit 307K that converts the voltage output by the rectifying circuit 305K to an analog voltage signal 314K. The bias voltage output by the rectifying circuit 305K is supplied to load 306K as a transfer bias.

The structure and operation of the other transfer bias generating circuits 350Y, 350M, 350C are similar. Transfer bias generator circuit 350Y includes a piezoelectric transducer driving circuit (PZT driving circuit) 303Y, a piezoelectric transducer (PZT) 304Y, a rectifying circuit 305Y, and a voltage conversion circuit 307Y; transfer bias generator circuit 350M includes a piezoelectric transducer driving circuit (PZT driving circuit) 303M, a piezoelectric transducer (PZT) 304M, a rectifying circuit 305M, and a voltage conversion circuit 307M; transfer bias generator circuit 350C includes a piezoelectric transducer driving circuit (PZT driving circuit) 303C, a piezoelectric transducer (PZT) 304C, a rectifying circuit 305C, and a voltage conversion circuit 307C. The rectifying circuits 305Y, 305M, 305C output transfer bias voltages to respective loads 306Y, 306M, 306C. The voltage conversion circuits 307Y, 307M, 307C generate respective analog voltage signals 314Y, 314M, 314C from the transfer bias voltages.

It will be appreciated that bias voltage output units other than the rectifying circuits 305K, 305Y, 305M, 305C shown in FIG. 3 may be used.

The piezoelectric transducer driving circuits 303K, 303Y, 303M, 303C include respective power metal oxide semiconductor field-effect transistors or other types of switching elements that they use to generate ac voltages responsive to the supplied driving pulses 312K, 312Y, 312M, and 312C.

The high-voltage control circuit 260 is a digital circuit that operates in synchronization with a clock signal supplied from the crystal oscillator 419. The printer engine controller 253 controls the high-voltage control circuit 260 by means of a reset signal 309, an output control signal 310, and data signals 311K, 311Y, 311M, 311C. The data signals 311K, 311Y, 311M, 311C are 8-bit parallel signals, each indicating a target value corresponding to a target voltage to be supplied to one of the loads 306K, 306Y, 306M, 306C. The high-voltage control circuit 260 has input terminals AIN_K, AIN_Y, AIN_M, AIN_C that receive the analog voltage signals 314K, 314Y, 314M, 314C from the voltage conversion circuits 307K, 307Y, 307M, 307C, and uses these signals 314K, 314Y, 314M, 314C to guide the voltages output to the loads 306K, 306Y, 306M, 306C to their target values. The high-voltage control circuit 260 includes a registers (not shown) for holding settings (described below) that the printer engine controller 253 supplies via a serial communication channel 340.

Figure 4:
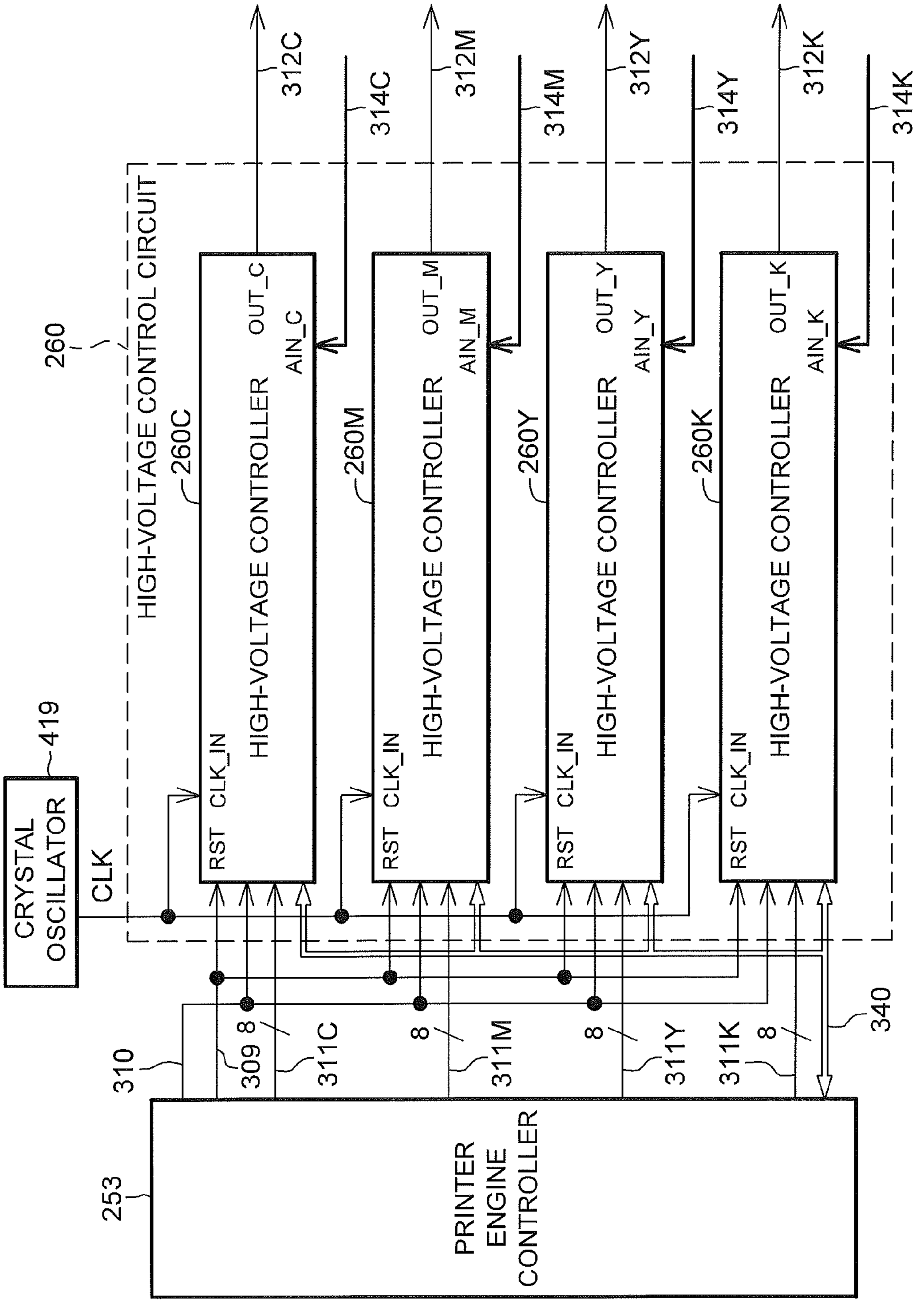
FIG. 4 is a functional block diagram schematically illustrating the structure of the high-voltage control circuit in FIG. 2.

The internal structure of the high-voltage control circuit 260 is shown in FIG. 4. The high-voltage control circuit 260 includes a high-voltage controller 260K for black images, a high-voltage controller 260Y for yellow images, a high-voltage controller 260M for magenta images, and a high-voltage controller 260C for cyan images. The high-voltage controllers 260K, 260Y, 260M, 260C receive respective data signals 311K, 311Y, 311M, 311C from the printer engine controller 253, and are linked to the printer engine controller 253 via the serial communication channel 340.

Figure 5:
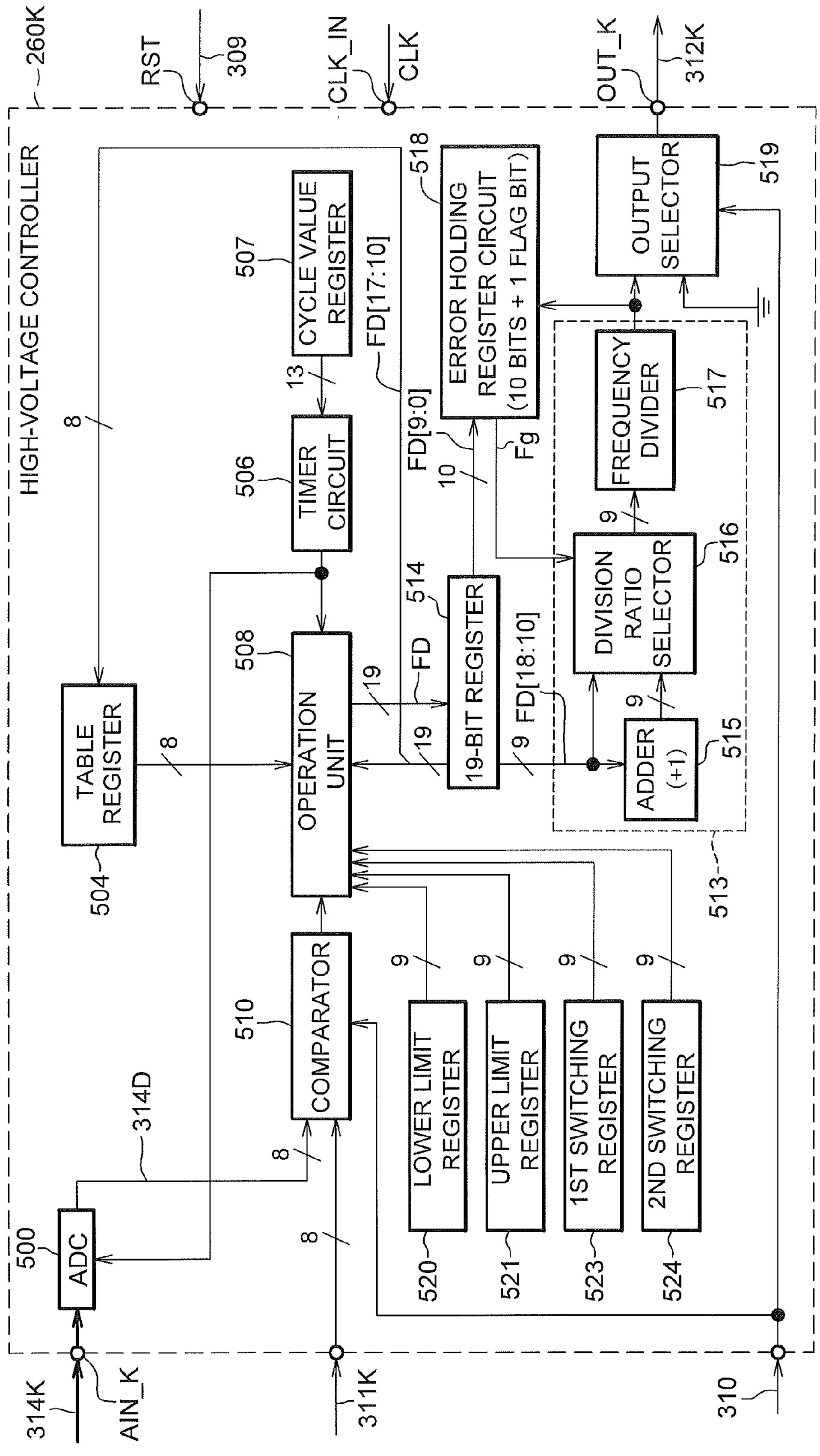
FIG. 5 is a functional block diagram showing an exemplary basic structure of one of the high-voltage controllers in FIG. 4.
Figure 6:
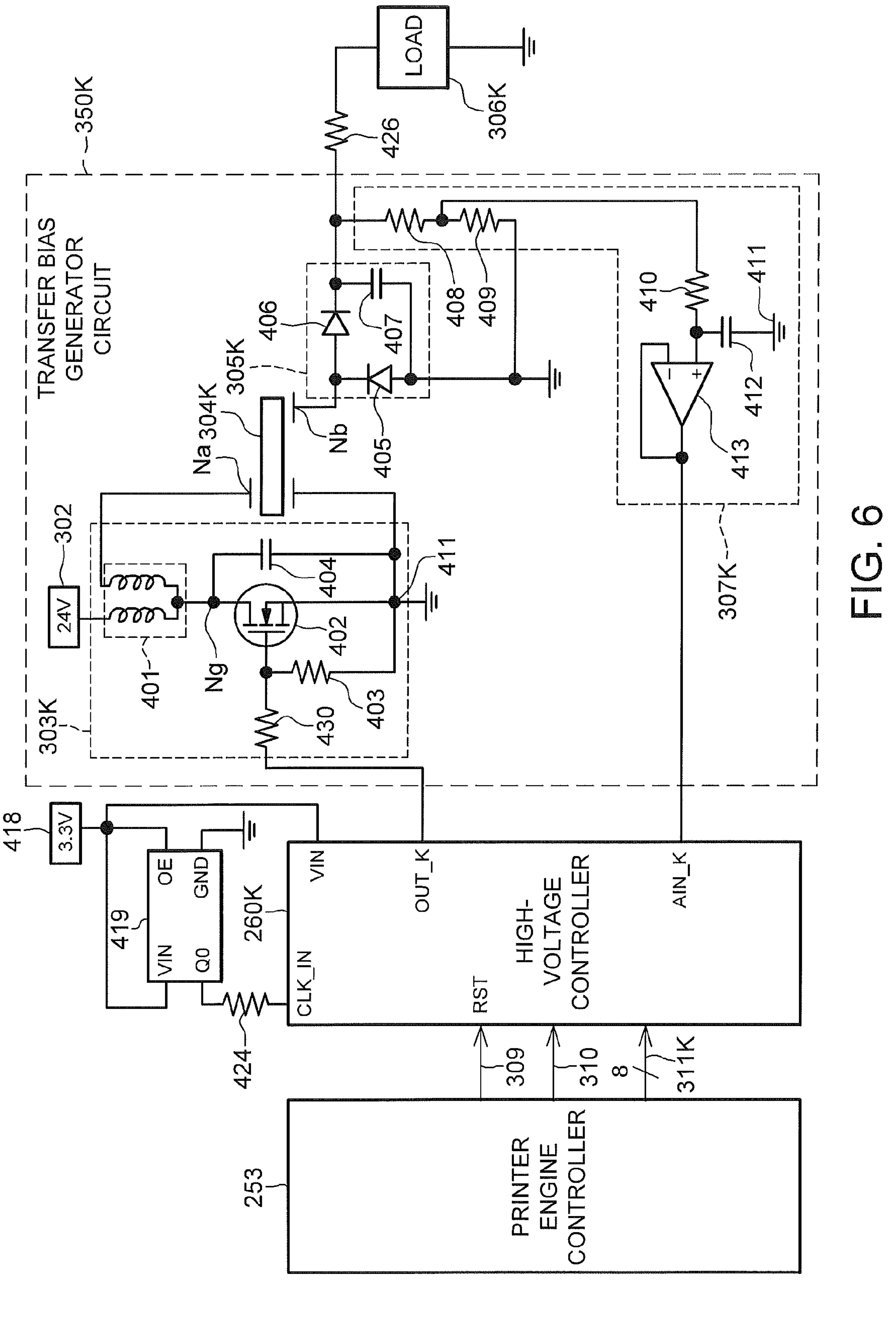
FIG. 6 is a schematic diagram showing an exemplary circuit structure of one of the transfer bias generating circuits in FIG. 3.

FIG. 5 illustrates the basic structure of high-voltage controller 260K in the first embodiment. FIG. 6 illustrates the detailed structure of transfer bias generator circuit 350K. High-voltage controllers 260Y, 260M, 260C and transfer bias generating circuits 350Y, 350C, 350M are also structured as shown in FIGS. 5 and 6.

As shown in FIG. 6, high-voltage controller 260K has a clock input terminal CLK_IN at which a reference clock signal (referred to below simply as a clock) is input from the crystal oscillator 419 via a resistance element 424. The crystal oscillator 419 has a voltage input terminal VIN, an output enable terminal OE, a clock output terminal Q0, and a ground terminal GND. The voltage input terminal VIN and output enable terminal OE receive a 3.3-volt driving voltage from a power source 418. In response to the 3.3-volt driving voltage, the crystal oscillator 419 used in this embodiment outputs a 50-MHz clock from its clock output terminal Q0. Operating in synchronization with this clock signal, high-voltage controller 260K generates driving pulses with approximately a thirty percent (30%) duty cycle (the ratio of the time during which each pulse is at the high logic level to the length of one pulse cycle) by dividing the clock frequency, and outputs the generated driving pulses from its OUT_K output terminal.

In response to the driving pulses supplied from the output terminal OUT_K of high-voltage controller 260K, the piezoelectric transducer driving circuit 303K in transfer bias generator circuit 350K generates the ac voltage supplied to the primary electrode of the piezoelectric transducer 304K. Piezoelectric transducer driving circuit 303K includes an autotransformer 401, a power metal oxide semiconductor field effect transistor (MOSFET) 402, resistor elements 403 and 430, and a capacitor 404. One end of the autotransformer 401 is connected to the dc power supply 302, which supplies a 24-volt dc voltage. The midpoint of the autotransformer 401 is connected via a node Ng to the drain electrode of the power MOSFET 402 and to one end of the capacitor 404. The other end of the autotransformer 401 is connected to a node Na that constitutes the primary electrode of the piezoelectric transducer 304K. The source electrode of the power MOSFET 402 and the other end of the capacitor 404 are both connected to a ground terminal 411. The gate electrode of the power MOSFET 402 is connected to the output terminal OUT_K of high-voltage controller 260K through resistor element 430. Resistor element 403 is inserted between the gate electrode and the ground terminal 411.

Figure 7:
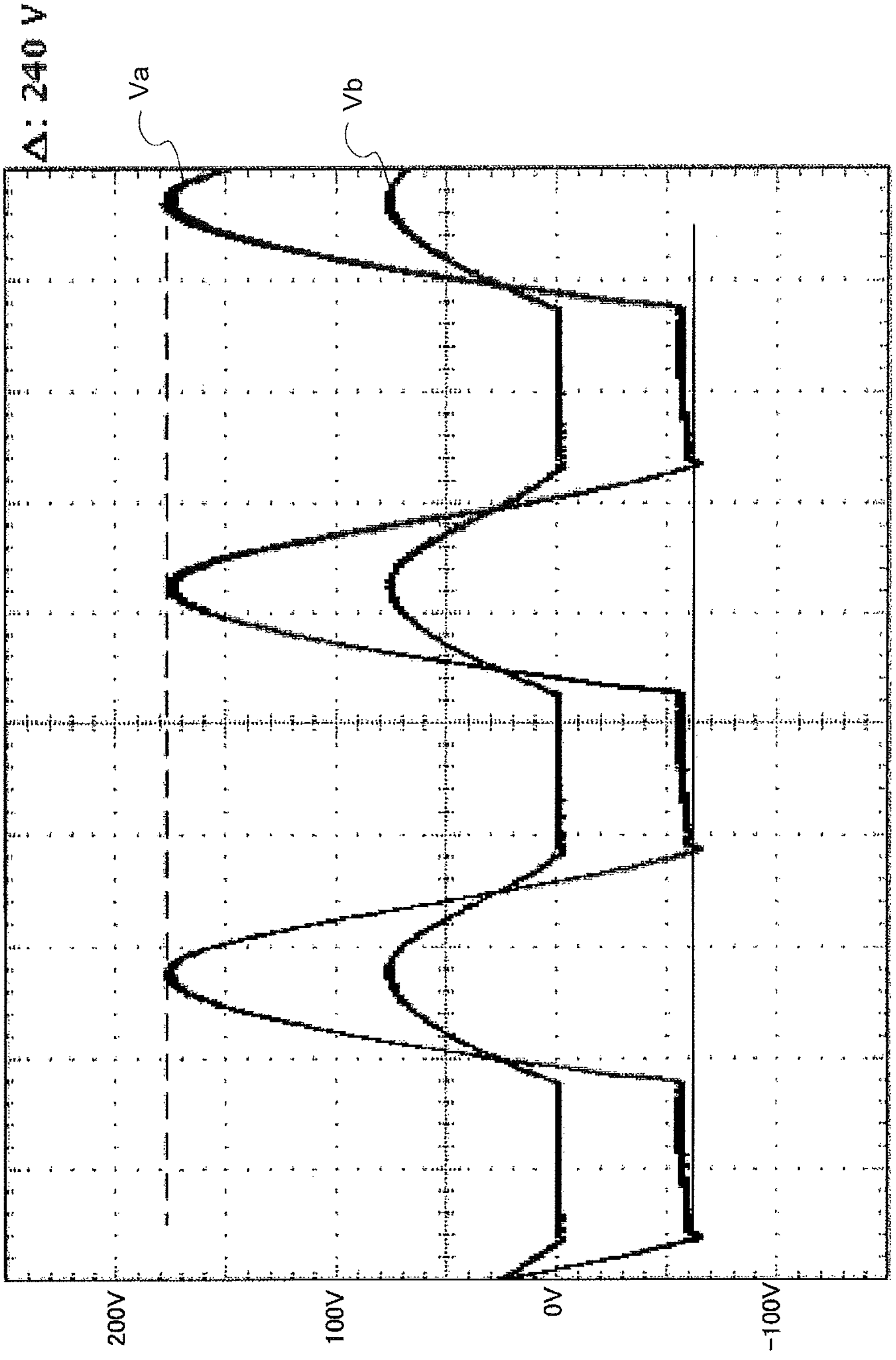
FIG. 7 is a graph illustrating an exemplary drain voltage waveform Vb of a transistor in the transfer bias generating circuit and an exemplary voltage waveform Va at the primary electrode of the piezoelectric transducer, in the first embodiment.

The autotransformer 401, capacitor 404, and piezoelectric transducer 304K constitute a resonant circuit. This resonant circuit is operative to apply a half-sinewave ac voltage to the primary electrode (input side electrode) of the piezoelectric transducer 304K. FIG. 7 shows the voltage waveform Vb at the drain electrode (node Ng) of the power MOSFET 402 and the voltage waveform Va at the primary electrode of the piezoelectric transducer 304K (node Na). As shown in FIG. 7, the resonant circuit causes the voltage applied to the primary electrode of the piezoelectric transducer 304K to rise and fall together with the rise and fall of the drain voltage of the power MOSFET 402. From its secondary electrode, the piezoelectric transducer 304K outputs an ac voltage with a value that depends on the switching frequency of the power MOSFET 402, that is, the frequency at which driving pulses are applied to its gate electrode. The output ac voltage is rectified by the rectifying circuit 305K and thereby converted to a dc voltage.

As shown in FIG. 6, the rectifying circuit 305K comprises high-voltage rectifying diodes 405 and 406 and a capacitor 407. The anode of high-voltage rectifying diode 405 and one end of the capacitor 407 are grounded. The cathode of high-voltage rectifying diode 405 is connected to node Nb and the anode of high-voltage rectifying diode 406. The cathode of high-voltage rectifying diode 406 is connected to the other end of the capacitor 407. The boosted ac voltage output from the piezoelectric transducer 304K is rectified by the high-voltage rectifying diodes 405 and 406 and smoothed by the capacitor 407 to generate a positive bias voltage.

Figure 8:
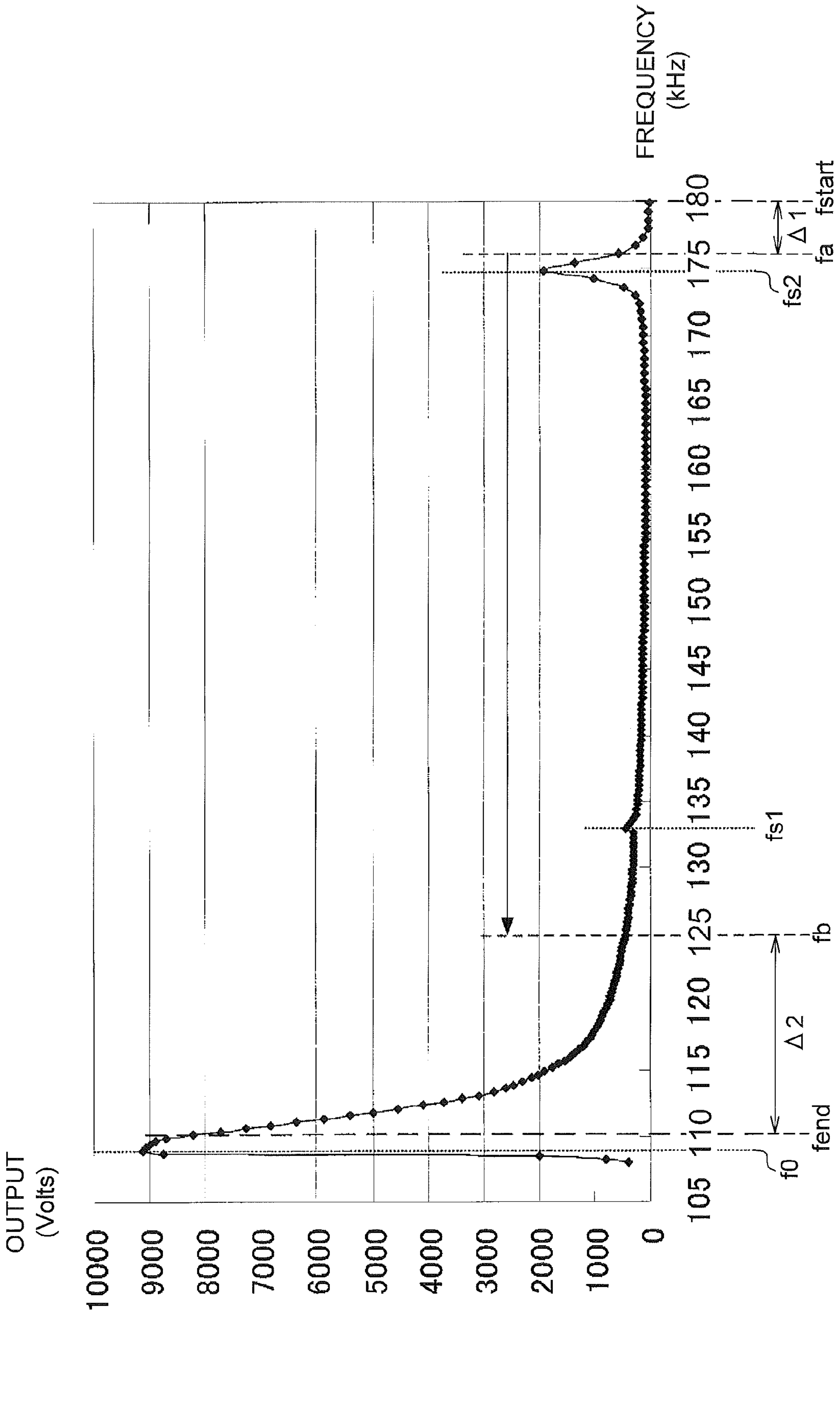
FIG. 8 is a graph illustrating the output voltage of the piezoelectric transducer in the first embodiment as a function of its driving frequency.

A piezoelectric resonator such as a piezoelectric ceramic plate has a natural resonant frequency; the natural resonant frequency of piezoelectric transducer 304K will be denoted f0. When the frequency of the ac voltage input at node Na is equal or close to the resonant frequency f0, a boosted ac voltage with an amplitude greater than the amplitude of the input ac voltage is generated at node Nb of the secondary electrode. The piezoelectric transducer 304K also has unwanted resonant frequencies, referred to as spurious frequencies, which are higher than the resonant frequency f0. The graph in FIG. 8 shows an exemplary output characteristic indicating the frequency of the ac voltage input to the piezoelectric transducer 304K (the driving frequency) and the output voltage. This characteristic curve indicates that besides the resonant frequency f0, which gives the maximum output voltage, the piezoelectric transducer 304K has two spurious frequencies fs1, fs2 in the frequency region above f0. The output characteristic shown in FIG. 8 is only an example; the output values and the location of the resonant and spurious frequencies may vary according to variations in the load impedance and the amount of current flowing through the load.

Referring again to FIG. 6, the output of the rectifying circuit 305K is supplied through a resistance element 426 to the load 306K and simultaneously to the voltage conversion circuit 307K. The voltage conversion circuit 307K includes resistance elements 408 and 409 connected in series to function as a voltage divider, a resistance element 410 and capacitor 412 connected to function as an RC filter, and an operational amplifier 413 connected to function as a voltage follower. Exemplary resistance values in the voltage divider are 100 MΩ ($10^8$Ω) for resistance element 408 and 33 kΩ ($3.3\times10^4$Ω) for resistance element 409, giving a 3.3/10,000 voltage division ratio. The voltage output from the rectifying circuit 305K is divided in the ratio determined by resistance elements 408 and 409 and smoothed by resistance element 410 and capacitor 412, and after impedance conversion by the operational amplifier 413, is input to analog input terminal AIN_K of high-voltage controller 260K for analog-to-digital conversion.

Referring back to FIG. 5, high-voltage controller 260K includes an analog-to-digital converter (ADC) 500, a table register 504, a timer circuit 506, a cycle value register 507, an operation unit 508, a comparator 510, a pulse generating circuit 513, a 19-bit register 514, an error holding register circuit 518, an output selector 519 and further registers 520, 521, 523, 524. The operation unit 508, 19-bit register 514, and table register 504 constitute the frequency control unit. The analog-to-digital converter 500 and the voltage conversion circuit 307K shown in FIG. 6 constitute a voltage detection unit.

The frequency control unit and voltage detection unit are not limited to the configurations shown in FIGS. 5 and 6; they may have other configurations.

The analog-to-digital converter 500 in FIG. 5 has 8-bit resolution and converts the analog signal 314K input at input terminal AIN_K to an 8-bit digital voltage signal 314D. The digital voltage signal 314D indicates a value (referred to below as a measured value or measured voltage value) corresponding to the output voltage of the transfer bias generator circuit 350K. The data signal 311K input from the 253 represents a target value corresponding to the target voltage. The comparator 510 receives an output control signal 310, and executes a comparison when the output control signal 310 is at the high logic level. Specifically, the comparator 510 outputs a 1-bit signal at the high logic level if the measured value is less than the target value, and at the low logic level if the measured value is equal to or greater than the target value. From the logic level of the signal output by the comparator 510, the operation unit 508 can tell whether or not the output voltage of the transfer bias generating circuit 350K is less than the target voltage.

Figure 9:
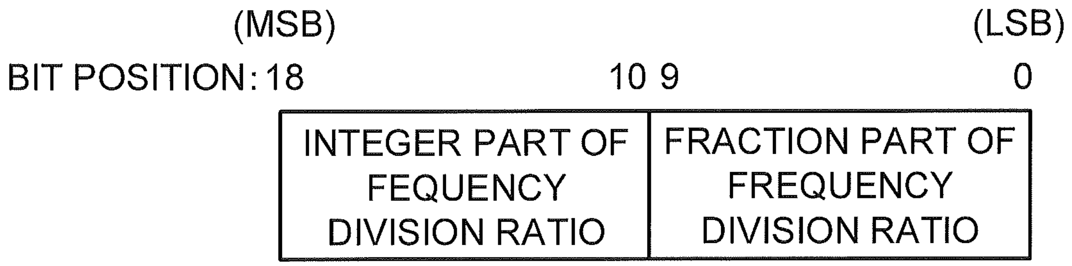
FIG. 9 illustrates the format of the frequency division ratio (FDR) stored in a 19-bit register in the first embodiment.

The operation unit 508 has the function of generating 19-bit frequency division ratio data FD, which are held in the 19-bit register 514. FIG. 9 shows the format of the frequency division ratio data FD. The frequency division ratio (FDR) has an integer part consisting of nine high-order bits FD[18:10] and a fraction part consisting of ten low-order bits FD[9:0].

The table register 504 in FIG. 5 is a lookup table (LUT) that inputs the eight low-order integer bits FD[17:10] of the frequency division ratio (FDR) stored in the 19-bit register 514 and outputs a corresponding 8-bit value to the operation unit 508. The input-output correspondence is illustrated in the tables in FIGS. 10 and 11, which show the input and output values in hexadecimal notation, as indicated by the suffix 'hex'. The full 9-bit value of the integer part of the frequency division ratio from which the input value is taken is also shown in hexadecimal notation.

The timer circuit 506 in FIG. 5 counts in synchronization with the clock signal CLK input at the clock input terminal CLK_IN and holds the count value. The count value is initially set at a 13-bit count cycle value, which is held in the cycle value register 507. The count value is then decremented (counting down) in synchronization with rising or falling CLK pulse edges. When the count value reaches '0', it is reset to the initial value (the count cycle value). Whenever the count value reaches '0', the timer circuit 506 outputs a timing pulse signal (more specifically, the rising edge or falling edge of the timing pulse signal) to the operation unit 508 and analog-to-digital converter 500. The count cycle value can be set so that the timing cycle has a length of 140 microseconds, for example, but it may be set to other values to provide cycle lengths of several tens to one hundred and several tens of microseconds. The analog-to-digital converter 500 performs one analog-to-digital conversion per timing cycle.

Whenever the operation unit 508 receives a timing pulse from the timer circuit 506, it generates new frequency division ratio data by adding the 8-bit output value of the table register 504 to the current 19-bit value of the frequency division ratio data FD or subtracting the 8-bit output value of the table register 504 from the current 19-bit value of the frequency division ratio data FD, and updates the frequency division ratio data FD by storing the newly generated frequency division ratio data in the 19-bit register 514.

The lower limit register 520 stores the lower limit value FDs of the integer part of the frequency division ratio FD[18:10], and the upper limit register 521 stores the upper limit value FDe of the integer part of the frequency division ratio FD[18:10]. The starting frequency fstart in FIG. 8 derives from the lower limit value FDs and the frequency fend from the upper limit value FDe. The operation unit 508 keeps the value of the integer part of the frequency division ratio FD[18:10] between the upper limit value FDe and the lower limit value FDs. The first switching register 523 in FIG. 5 stores a first switchover value SWa corresponding to a switchover frequency fa shown in FIG. 8. The second switching register 524 in FIG. 5 stores a second switchover value SWb corresponding a switchover frequency fb in FIG. 8. These registers 520, 521, 523, 524 have nonvolatile memory elements.

The pulse generating circuit 513 in FIG. 5 includes an adder 515, a division ratio selector 516, and a frequency divider 517. The adder 515 receives the 9-bit integer part FD[18:10] of the frequency division ratio from the 19-bit register 514, increments its value by a prescribed amount (e.g., '1'), and supplies the incremented value to the division ratio selector 516.

The division ratio selector 516 selects either the 9-bit integer part FD[18:10] of the frequency division ratio or the output of the adder 515 according to the logic level of a flag signal Fg output from the error holding register circuit 518, and outputs the selected value to the frequency divider 517. The frequency divider 517 divides the frequency of the clock CLK, using the 9-bit output value of the division ratio selector 516 as the frequency division ratio, and thereby generates driving pulses with approximately a 30% duty cycle. The pulse cycle of the driving pulses is proportional to the 9-bit output value of the division ratio selector 516. The division ratio selector 516 selects the 9-bit integer value FD[18:10] when the flag signal Fg is at the low logic level, and selects the 9-bit output of the adder 515 when the flag signal Fg is at the high logic level.

The output selector 519 selects the driving pulse output from the frequency divider 517 when the output control signal 310 is at the high logic level. When the output control signal 310 is at the low logic level, the output selector 519 selects the ground voltage. The selected output (pulse output or ground voltage) is output as the driving pulse signal 312K from the output terminal OUT_K to the transfer bias generator circuit 350K The error holding register circuit 518 has a 10-bit error storage area in which the fraction part of the frequency division ratio FD[9:0] output from the frequency division ratio data in the 19-bit register 514 is captured and accumulated, and a flag storage area in which the 1-bit flag signal Fg is stored. The error holding register circuit 518 captures the fraction part of the frequency division ratio FD[9:0] input from the 19-bit register 514 at every driving pulse edge (rising or falling edge) of the output from the frequency divider 517 in the pulse generating circuit 513, then adds the captured fraction part of the frequency division ratio [9:0] to the cumulative error value held in the error storage area, and stores the result in the error storage area as a new cumulative error value. If the cumulative error exceeds a threshold value and overflows the error storage area, the error holding register circuit 518 sets the flag signal Fg to the high logic level. The overflow also causes the cumulative error to return to a value less than the value immediately before the overflow. The flag signal Fg remains high for one driving pulse cycle, and is then reset to the low logic level when the error holding register circuit 518 receives the next pulse edge.

Accordingly, while the logic level of the flag signal Fg remains low, the frequency divider 517 generates the driving pulses by dividing the frequency of the clock CLK by the integer part FD[18:10] of the frequency division ratio, which it receives from the 19-bit register 514 via the division ratio selector 516. During this time, the fraction part FD[9:0] of the frequency division ratio is not used by the frequency divider 517, but continues to accumulate in the error storage area of the error holding register circuit 518.

When the cumulative error exceeds the threshold value, overflowing the error storage area, and the flag signal Fg goes high, and the frequency divider 517 generates the next driving pulse by dividing the frequency of the clock CLK by the output value of the adder 515, which is greater (e.g., greater by 1) than the integer part of the frequency division ratio. The fraction part FD[9:0] of the frequency division ratio is thereby diffused into the integer part FD[18:10] so that frequency error occurring at a certain time t0 appears in the frequency division ratio used at another time t1 (≠t0). This error diffusion technique enables high-voltage controller 260K to control the driving frequency of the piezoelectric transducer 304K with a resolution of more than nine bits.

The operation of the image forming device 100 in the first embodiment will now be described in detail.

When first powered on, the image forming device 100 begins an initial operation at the direction of the control circuit 200. Specifically, the printer engine controller 253 in the control circuit 200 in FIG. 2 causes the belt motor 256 to turn the driven roller 106 to drive the transfer belt 108, the drum motor 258 to turn the photosensitive drums 132K, 132Y, 132M, 132C, and the high-voltage control circuit 260 to have the charging bias generator 261, developing bias generator 262, and transfer bias generator 263 output respective voltages. The high-voltage controllers 260K, 260Y, 260M, 260C in FIG. 4 supply driving pulses 312K, 312Y, 312M, 312C to the transfer bias generator circuits 350K, 350Y, 350M, 350C that drive their piezoelectric transducers in an idling mode to warm up. This raises the temperature of the piezoelectric ceramic plates or other piezoelectric resonators constituting the piezoelectric transducers, stabilizing the characteristics of the piezoelectric transducers.

The image processing section 251 then receives print data in a PDL or other format via the host interface 250 in FIG. 2, generates bitmap data (image data) from the print data, and outputs the generated bitmap data to the LED interface 252 and printer engine controller 253. The printer engine controller 253 controls the operation of the fuser heater 151 to heat the fusing roller 118A in FIG. 1. When the temperature detected by the thermistor 150 reaches a prescribed value, the printer engine controller 253 causes the image forming device 100 to start image forming operations.

First, the hopping motor 254 in FIG. 2 drives the hopping roller 114. Rotation of the hopping roller 114 takes a sheet of the recording medium 110 from the cassette 113 and guides it toward the registration rollers 116, 117, which are driven by the registration motor 255. The rotation of the registration rollers 116, 117 propels the recording medium 110 taken from the cassette 113 through the media sensor 140 and onto the transfer belt 108. The transfer belt 108 carries the recording medium 110 under the developers 102K, 102Y, 102M, 102C successively at a prescribed transport speed.

The printer engine controller 253 controls the operational timings of the developers 102K, 102Y, 102M, 102C separately, based on the detection signal from the media sensor 140 and the transport speed of the recording medium 110. In the developers 102K, 102Y, 102M, 102C, the charging rollers 136K, 136Y, 136M, 136C uniformly charge the surfaces of the photosensitive drums 132K, 132Y, 132M, 132C. The LED heads 103K, 103Y, 103M, 103C emit light in patterns corresponding to the bitmap data, thereby exposing the photosensitive drums 132K, 132Y, 132M, 132C and forming respective electrostatic latent images on their surfaces. The developing rollers 134K, 134Y, 134M, 134C bring developing agents that cling to the electrostatic latent images, thereby forming developed images. The transfer rollers 105K, 105Y, 105M, 105C receive transfer bias voltages from the transfer bias generator circuits 350K, 350Y, 350M, 350C in FIG. 3 and transfer the four developed images of different colors (black, yellow, magenta, cyan) on the photosensitive drums 132K, 132Y, 132M, 132C to the surface of the recording medium 110 on the transfer belt 108. After that, the fuser 118 fuses the combined four-color developed image onto the recording medium 110 and then ejects the recording medium 110 via the guide 119 to the tray 120.

The operation of the high-voltage power supply 301 will now be described in detail.

As shown in FIGS. 3 and 4, the high-voltage power supply 301 is organized into four channels with respective high-voltage controllers 260K, 260Y, 260M, 260C and transfer bias generator circuits 350K, 350Y, 350M, 350C. All four channels have the same structure, so the following description will focus on the operation of the high-voltage controller 260K and transfer bias generator circuit 350K in the black image channel.

After the image forming device 100 is powered on, the printer engine controller 253 drives the reset signal 309 to reset the high-voltage control circuit 260 and initialize its register values. The reset signal is received at the reset terminals RST of the high-voltage controllers 260K, 260Y, 260M, 260C in FIG. 4.

Next, the printer engine controller 253 supplies 8-bit data signals 311K, 311Y, 311M, 311C to the high-voltage controllers 260K, 260Y, 260M, 260C. Each of these data signals 311K, 311Y, 311M, 311C represents a target value from 00hex to FFhex corresponding to a target voltage from zero volts to ten kilovolts (10 kV). In the initial operation of the image forming device 100, the printer engine controller 253 sets the data signals 311K, 311Y, 311M, 311C to 00hex to drive the piezoelectric transducers in the idling mode. During image forming operations after completion of the initial operation, the printer engine controller 253 sets the data signals 311K, 311Y, 311M, 311C to target values in the range between 1Ahex and CChex, corresponding to target voltages suited for transfer of the developed images on the surfaces of the photosensitive drums 132K, 132Y, 132M, 132C, typically voltages between 1 kV and 8 kV.

The printer engine controller 253 drives the output control signal 310 to the high logic level at a prescribed timing in the period in which the transfer belt 108 is being driven during the initial operation of the image forming device 100, and at prescribed timings when recording media 110 pass through the areas (nip areas) between transfer roller 105K and photosensitive drum 132K, between transfer roller 105Y and photosensitive drum 132Y, between transfer roller 105M and photosensitive drum 132M, and between transfer roller 105C and photosensitive drum 132C, to transfer the developed images.

When the output control signal 310 goes high, the high-voltage control circuit 260 immediately starts output of driving pulses 312K, 312Y, 312M, 312C from its output terminals OUT_K, OUT_Y, OUT_M, OUT_C. Responsive to the driving pulses 312K, 312Y, 312M, 312C, the piezoelectric transducer driving circuits 303K, 303Y, 303M, 303C switch the voltage generated by the dc power supply 302 in FIG. 3, thereby supplying positive half-sinewaves to the primary electrodes of the piezoelectric transducers 304K, 304Y, 304M, 304C. This causes the piezoelectric transducers 304K, 304Y, 304M, 304C to output converted sinewave (ac) voltages at their secondary electrodes. The rectifying circuits 305K, 305Y, 305M, 305C rectify and smooth the converted ac voltages, thereby generating output voltages. These output voltages are applied to the axial shafts of the transfer rollers 105K, 105Y, 105M, 105C that constitute their respective loads 306K, 306Y, 306M, 306C.

The voltage conversion circuits 307K, 307Y, 307M, 307C convert the output voltages to analog voltage signals 314K, 314Y, 314M, 314C with values in the range from, for example, 0 to 3.3 volts, and input the analog voltage signals 314K, 314Y, 314M, 314C to the input terminals AIN_K, AIN_Y, AIN_M, AIN_C of the high-voltage control circuit 260. The high-voltage control circuit 260 converts the analog voltage signals 314K, 314Y, 314M, and 314C to digital voltage signals which it uses to control the driving frequencies, thereby holding the output voltages at their target values.

As an example, it will be assumed that all the piezoelectric transducers 304K, 304Y, 304M, 304C have the output characteristic shown in FIG. 8. During image-forming operation, the high-voltage controllers 260K, 260Y, 260M, 260C keep the driving frequencies within two ranges Δ1, Δ2 that exclude the spurious frequencies fs1 and fs2. Each driving frequency starts out at the upper limit fstart of the first frequency range Δ1 (approximately 179.86 kHz, which is 1/278 of the 50-MHz clock frequency).

In high-voltage controller 260K, the output of the comparator 510 in FIG. 5 goes high when the measured value represented by the digital voltage signal 314D is less than the target value (measured value<target value). While the comparator output is high, the operation unit 508 increases the 19-bit value FD[18:0] of the frequency division ratio in steps by adding the 8-bit value output from the table register 504, causing the pulse generating circuit 513 to output driving pulses with a stepwise decreasing switching frequency. The driving frequency accordingly decreases stepwise from its starting point at the upper limit frequency fstart. In the first frequency range Δ1, comparatively low voltages are output, as shown by the output characteristic in FIG. 8.

When the driving frequency reaches a switchover frequency fa at the lower limit of the first frequency range Δ1, the value of the integer part FD[18:10] of the frequency division ratio reaches a corresponding first switchover value SWa (=11Chex). The switchover frequency fa in FIG. 8 is approximately 176.06 kHz, which is obtained by dividing the 50-MHz clock frequency by 284. At this point the operation unit 508 updates the frequency division ratio data FD by changing the value of the integer part FD[18:10] of the frequency division ratio to a second switchover value SWb (=190hex), corresponding to a switchover frequency fb at the upper limit of the second frequency range Δ2. The second switchover value SWb is approximately 125.00 kHz, obtained by dividing the 50-MHz clock frequency by 400.

This change causes the pulse generating circuit 513 to output driving pulses with a switching frequency corresponding to the second switchover value SWb, so the driving frequency jumps to switchover frequency fb, skipping over the spurious frequencies fs1 and fs2.

At switchover frequency fb, the measured output voltage is still less than the target voltage so the operation unit 508 resumes the stepwise increase of the 19-bit value FD[18:0] of the frequency division ratio, and the driving frequency decreases stepwise from the switchover frequency fb toward the resonant frequency f0. As the driving frequency approaches f0, the output voltage rises.

When the measured voltage value becomes equal to or greater than the target value (measured value≥target value), the output of the comparator 510 in FIG. 5 goes low and the operation unit 508 begins subtracting the 8-bit output of the table register 504 from the 19-bit FD[18:0] of the frequency division ratio data, instead of adding it. The frequency division ratio now decreases in steps, causing the pulse generating circuit 513 to output driving pulses with a stepwise increasing switching frequency. When the stepwise increase in the driving frequency takes the measured output voltage below the target value, the operation unit 508 resumes the stepwise increase of the 19-bit value FD[18:0] of the frequency division ratio data, causing the driving frequency to fall and the output voltage to rise. The driving frequency then continues to be increased and decreased in this way, keeping the output voltage substantially equal to the target voltage.

As described above, the pulse generating circuit 513 in this embodiment accumulates the fraction part FD[9:0] of the frequency division ratio as an error, and when the cumulative error exceeds a threshold value, the value of the integer part FD[18:10] of the frequency division ratio is temporarily increased, so the driving frequency can be controlled with a higher resolution than the 9-bit resolution of the integer part FD[18:10] of the frequency division ratio. Accordingly, high-voltage controller 260K can stabilize the output voltage at a constant target voltage with high precision.

For example, let the integer part FD[18:10] of the frequency division ratio be FDi and the fraction part FD[9:0] be FDd. If FDi and FDd remain constant over $2^{10}$ driving pulses (1024 pulses) and one overflow occurs in the error holding register circuit 518 during this 1024-pulse period, the average value of the 9-bit frequency division ratio output from the division ratio selector 516 becomes substantially FDi+FDd/1024.

More generally, if the 19-bit value frequency division ratio stored in the 19-bit register 514 does not vary over a $2^{10}$-pulse period, and overflows occur at K of these 1024 pulses period but do not occur at the remaining M pulses, where K and M are non-negative integers equal to or less than 1024 (K=1024−M), then the average value of the 9-bit frequency division ratio output from the division ratio selector 516 is given by the following equation.

$$\{FDi \times M + (FDi+1) \times (1024-M)\}/1024 = FDi + K/1024$$

In the above equation, K can be regarded as substantially equal to the value of the ten low-order bits of the frequency division ratio data FD, that is, the value of the fraction part FD[9:0] of the frequency division ratio. This equation assumes that the 19-bit value stored in register 514 (the value of the frequency division ratio data FD) remains constant during the 1024-pulse period, but even if the 19-bit value varies, it has been confirmed that the average value per unit time on the left side of the equation is substantially equal to the average value per unit time of FDi+FDd/1024. Accordingly, since the value FDd of the fraction part FD[9:0] of the frequency division ratio is reflected in the average frequency division ratio, the pulse generating circuit 513 in this embodiment can control the driving frequency with a higher resolution than if only the value FDi of the integer part FD[18:10] of the frequency division ratio were to be used.

Exemplary output voltage values corresponding substantially to the range of driving frequencies shown in FIG. 8, given by integer frequency division ratios FD[18:10] from 116hex to 1CFhex, are shown in the tables in FIGS. 12 and 13. From FIG. 12, the output voltages in the first frequency range Δ1 (179.86 kHz to 176.06 kHz) range from 25 to 570 volts. Near the starting point fstart of the first frequency range Δ1, the output voltage is near 25 volts. From FIGS. 12 and 13, the output voltages in the second frequency range Δ2 (125.00 kHz to 110.13 kHz) range from 450 to 8210 volts.

An exemplary control procedure used by the operation unit 508 will now be described in detail with reference to FIG. 14. Although the procedure in FIG. 14 is shown in flowchart form, it can be implemented by hardware designed by using, for example, a hardware description language (HDL) or other logic description language.

Figure 14:
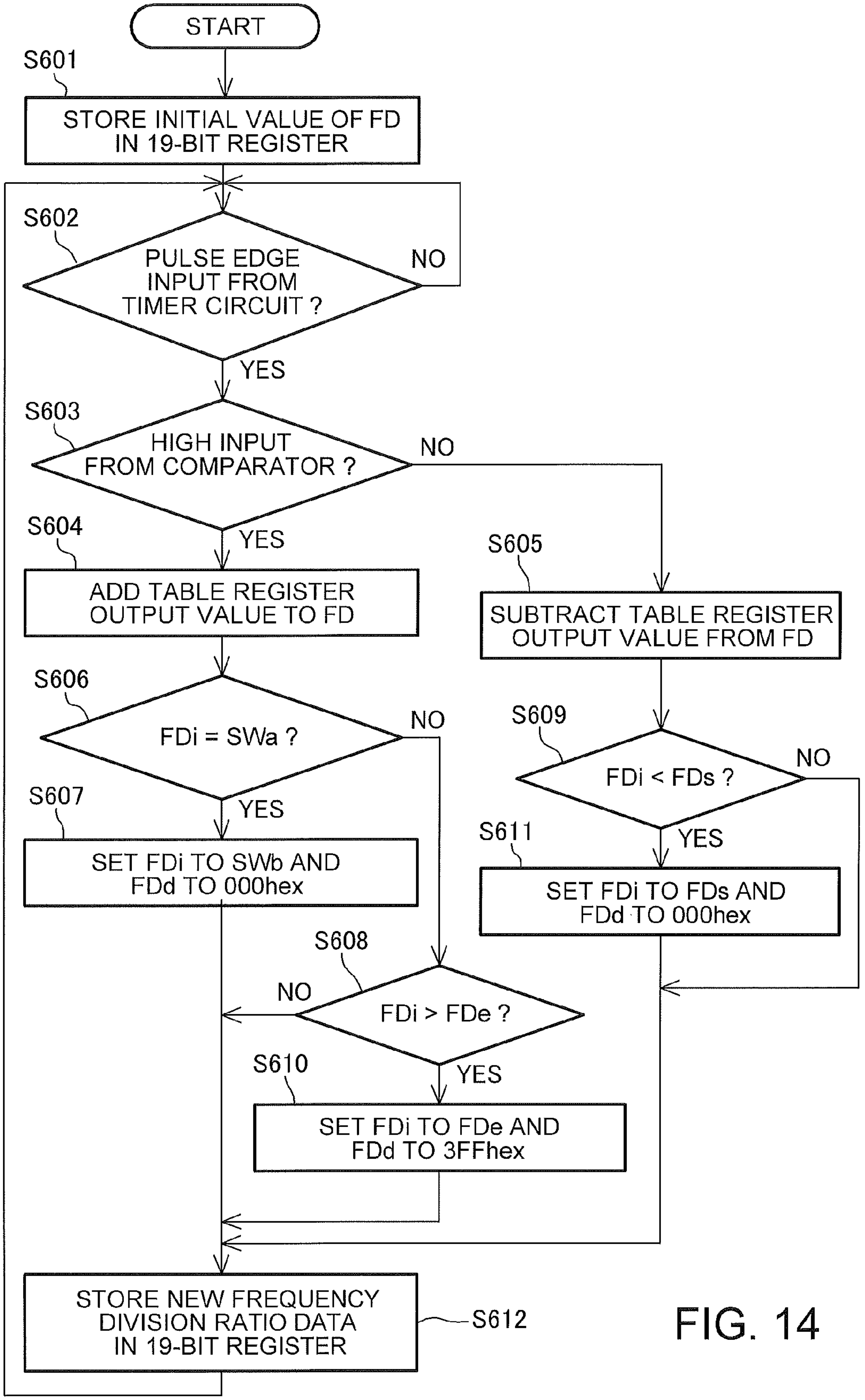
FIG. 14 is a flowchart schematically illustrating a control procedure executed by the operation unit in FIG. 5.

Before the procedure in FIG. 14 starts, a counting cycle value is set in the cycle value register 507. For a 50-MHz clock frequency, a count cycle value of seven thousand (1B58hex) may be set. The timer circuit 506 uses this count frequency value to output a pulse signal with a 140-μs cycle length to the analog-to-digital converter 500 and the operation unit 508. The analog-to-digital converter 500 performs one analog-to-digital conversion per 140-μs cycle and supplies the resulting digital voltage signal 314D to the comparator 510. The operation unit 508 performs digital operations in synchronization with the 140-μs cycle pulse signal.

Referring to FIG. 14, when the reset signal 309 input to the reset terminal RST of the high-voltage control circuit 260 in FIG. 3 goes high, the operation unit 508 stores the initial value of the frequency division ratio data FD in the 19-bit register 514 (step S601). Specifically, the nine high-order bits of the frequency division ratio data FD, representing the integer part FD[18:10] of the frequency division ratio, are initialized to 116hex, corresponding to the upper limit fstart of the first frequency range Δ1, and the ten low-order bits of the frequency division ratio data FD, representing the fraction part FD[9:0] of the frequency division ratio, are initialized to 000hex. As a result, the 19-bit initial value of the frequency division ratio data FD set in the 19-bit register 514 is 45800hex.

Then the operation unit 508 waits for the input of a pulse edge from the comparator 510 (No in step S602). When the operation unit 508 detects the input of a pulse edge from the comparator 510 (Yes in step S602), it decides whether the logic level of the output signal of the comparator 510 is high or low (step S603).

If the measured voltage value is less than the target value, the operation unit 508 finds that the comparator output is high (Yes in step S603) and adds the output value of the table register 504 to the current 19-bit value of the frequency division ratio data FD stored in the 19-bit register 514, thereby updating the frequency division ratio data (step S604).

Next, the operation unit 508 tests the upper 9 bits FD[18:10] of the frequency division ratio data FD, representing the value FDi of the integer part of the frequency division ratio, to decide whether FDi is equal to the first switchover value SWa (=11Chex) (step S606). When the updating of the frequency division ratio data FD brings the driving frequency to the switchover frequency fa in FIG. 8, the value FDi of the integer part FD[18:10] of the frequency division ratio is found to be equal to the first switchover value SWa (=11Chex). The operation unit 508 now updates the frequency division ratio data FD by setting the value FDi of the integer part FD[18:10] to the second switchover value SWb (=190hex) and the value FDd of the fraction part FD[9:0] to 000hex (step S607), and stores the updated frequency division ratio data FD in the 19-bit register 514 (step S612). The result is that the driving frequency skips over the spurious frequencies fs1, fs2 and changes to the switchover frequency fb in the second frequency range Δ2, as shown in FIG. 8.

If the operation unit 508 finds that the value FDi of the integer part FD[18:10] of the frequency division ratio is not equal to the first switchover value SWa (No in step S606), it decides whether FDi exceeds the upper limit value FDe (=1C6hex) corresponding to frequency fend in FIG. 8 (step S608). If FDi does not exceed the upper limit FDe (No in step S608), the process proceeds to step S612. If FDi exceeds the upper limit FDe (Yes in step S608), the operation unit 508 updates the frequency division ratio data FD by setting the value FDi of the integer part FD[18:10] to the upper limit value FDe (=1C6hex) and the value FDd of the fraction part FD[9:0] to 3FFhex (step S610), and stores the updated frequency division ratio data FD in the 19-bit register 514 (step S612). This prevents the driving frequency control from wandering below the lower limit value fend of the second frequency range Δ2.

When the measured voltage value is equal to or greater than the target value, the operation unit 508 finds that the logic level of the signal received from the comparator 510 is low (No in step S603) and subtracts the output value of the table register 504 from the current 19-bit value of the frequency division ratio data FD stored in the 19-bit register 514, thereby updating the frequency division ratio data (step S605).

Next, the operation unit 508 decides whether or not the value FDi of the integer part FD[18:10] of the frequency division ratio of the updated frequency division ratio data FD is less than the lower limit value FDs (=116hex) corresponding to the fstart frequency in FIG. 8 (step S609). If FDi is not less than the lower limit value FDs (No in step S609), the process proceeds to step S612. If FDi is less than the lower limit value FDs (Yes in step S609), the operation unit 508 updates the frequency division ratio data FD by setting the value FDi of the integer part FD[18:10] to the lower limit value FDs (=116hex) and the value FDd of the fraction part FD[9:0] to 000hex (step S611), and stores the updated frequency division ratio data FD in the 19-bit register 514 (step S612). This reliably prevents the driving frequency control from going above the upper limit value fstart of the first frequency range Δ1. After step S612, the process returns to step S602.

By controlling the 19-bit value stored in the 19-bit register 514 according to the procedure shown in FIG. 14 as described above, the operation unit 508 limits the driving frequency to values within the first and second frequency ranges Δ1, Δ2 by jumping over a range including the spurious frequencies fs1, fs2.

The high-voltage controller 260K in the first embodiment thereby keeps the driving frequency within a first frequency range Δ1 higher than the spurious frequencies fs1 and fs2 and a second frequency range Δ2 lower than the spurious frequencies fs1 and fs2. When the driving frequency reaches the lower limit fa of the first frequency range Δ1, it is changed to the switchover frequency fb in the second frequency range Δ2, beyond the spurious frequencies fs1, fs2. Therefore, the spurious frequencies fs1, fs2 are reliably avoided, and a low voltage with a small absolute value can be supplied to the load 306K by using a driving frequency near the starting frequency fstart in the first frequency range Δ1. The other high-voltage controllers 260Y, 260M, 260C control their driving frequencies in the same way as high-voltage controller 260K.

When the target voltage is set at or near zero volts, the driving frequency is held near the starting frequency fstart in FIG. 8, and the output voltage is held to values of only 25 to 35 volts (FIG. 12), using driving frequencies from 179.86 kHz to 179.21 kHz. This very low-voltage idling mode enables the piezoelectric transducers to be warmed up with minimal unwanted transfer of residual toner or other developing agents from the photosensitive drums 132K, 132Y, 132M, 132C during the initial operation without transport of a recording medium 110. This reduces contamination of the transfer belt 108, transfer rollers 105K, 105Y, 105M, 105C, and other components, and prolongs the replacement time of the collecting receptacle 112.

In contrast, if the starting frequency fstart is set to a conventional value between spurious frequency fs1 and the resonant frequency f0, such as a value in the vicinity of 130 kHz, a 300-volt or higher voltage is supplied (see FIG. 12) and more transfer of developing agents occurs during warmup, causing unwanted contamination and forcing the collecting receptacle to be replaced more often.

By driving the piezoelectric transducers 304K, 304Y, 304M, and 304C in the idling mode during the initial operation, it is also possible to prevent the voltage boosting ratios of the piezoelectric transducers 304K, 304Y, 304M, 304C from decreasing during image forming operation. In addition, since the driving frequency is brought from the first frequency range Δ1 to the second frequency range Δ2 by skipping over the spurious frequencies fs1, fs2 in a large jump, the time (startup time) from the start of initial operation to the start of image forming operation can be shorter than in the prior art, despite the wide separation between the two ranges.

The optimal register settings in the high-voltage control circuit 260 (e.g., the values held in the lower limit register 520, upper limit register 521, first switching register 523, and second switching register 524) vary depending on the circuit configuration of the piezoelectric transducer driving circuits 303K, 303Y, 303M, 303C, the product type of the piezoelectric transducers 304K, 304Y, 304M, 304C, manufacturing variations of the piezoelectric transducers 304K, 304Y, 304M, 304C, and other factors. These settings may be optimized by preliminary testing. The nonvolatile memory elements used in these registers may be replaced with random access memory (RAM) elements to facilitate such tests.

Second Embodiment

The image forming device in the second embodiment has the same structure as the image forming device 100 in the first embodiment except for the configuration of the high voltage control circuit.

Figure 15:
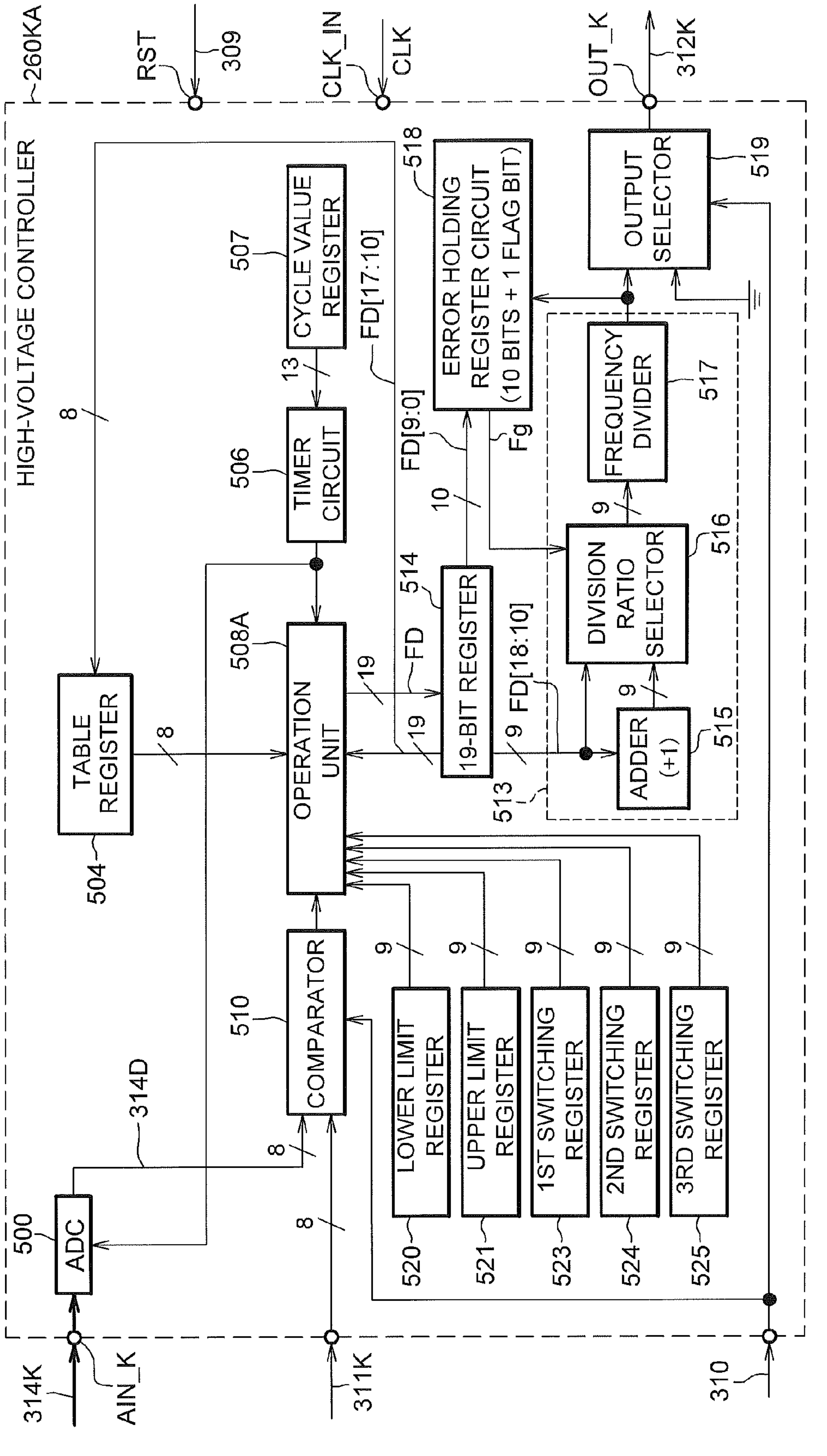
FIG. 15 is a block diagram illustrating the basic structure of the high-voltage controller in a second embodiment of the invention.
Figure 16:
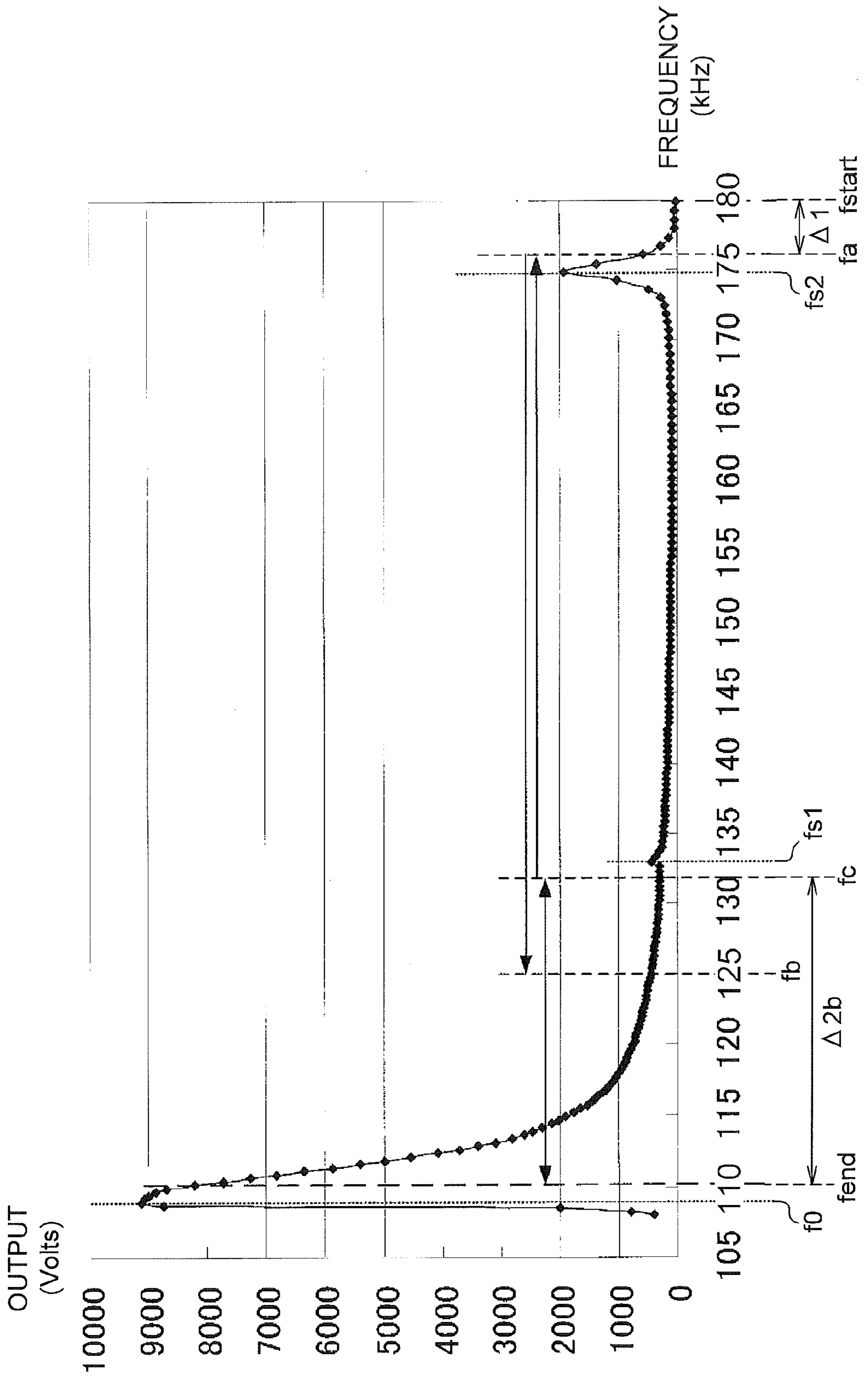
FIG. 16 is a graph illustrating an exemplary output characteristic of the piezoelectric transducer in the second embodiment.

As in the first embodiment, the high voltage control circuit consists of high voltage controllers, all having the same internal structure, for the colors black, yellow, magenta, and cyan. As an example, FIG. 15 illustrates the basic structure of the high-voltage controller 260KA for black images in the second embodiment. The only differences from the high-voltage controller 260K in the first embodiment (FIG. 5) are the addition of a third switching register 525, and an internal modification in the operation unit 508A that causes the high voltage controller to operate as indicated by the arrows in FIG. 16. Switchover frequencies fa and fb in FIG. 16 are the same as in the first embodiment, but the upper limit of the second frequency range Δ2b is now another switchover frequency fc, higher than switchover frequency fb. Switchover frequency fc is held in the third switching register 525.

When the measured voltage value represented by the digital voltage signal 314D is less than the target value (measured value<target value) the driving frequency is decreased stepwise. When this stepwise decrease brings the driving frequency to the lower limit fa of the first frequency range Δ1 in FIG. 16, it jumps to switchover frequency fb in the second frequency range Δ2b, skipping over the spurious frequencies fs1, fs2, and then resumes its stepwise decrease until the measured voltage value reaches the target value. Thereafter, the driving frequency is varied as necessary to make the output voltage track the target voltage. In these operations, the high-voltage controller 260KA operates like the high-voltage controller 260K in the first embodiment.

If, while being varied, the driving frequency increases to switchover frequency fc, as may occur if the target voltage is changed during driving frequency control, the high-voltage controller 260KA updates the frequency division ratio to make the driving frequency jump back to the switchover frequency fa at the lower limit of the first frequency range Δ1, again skipping over the spurious frequencies fs1, fs2. This enables the high-voltage controller 260KA to switch the target frequency in either direction between the first frequency range Δ1 and second frequency range Δ2b while continuing to keep the driving frequency away from the spurious frequencies fs1, fs2, so that driving pulses with a driving frequency in either the first or second range can be produced as the need arises.

Figure 17:
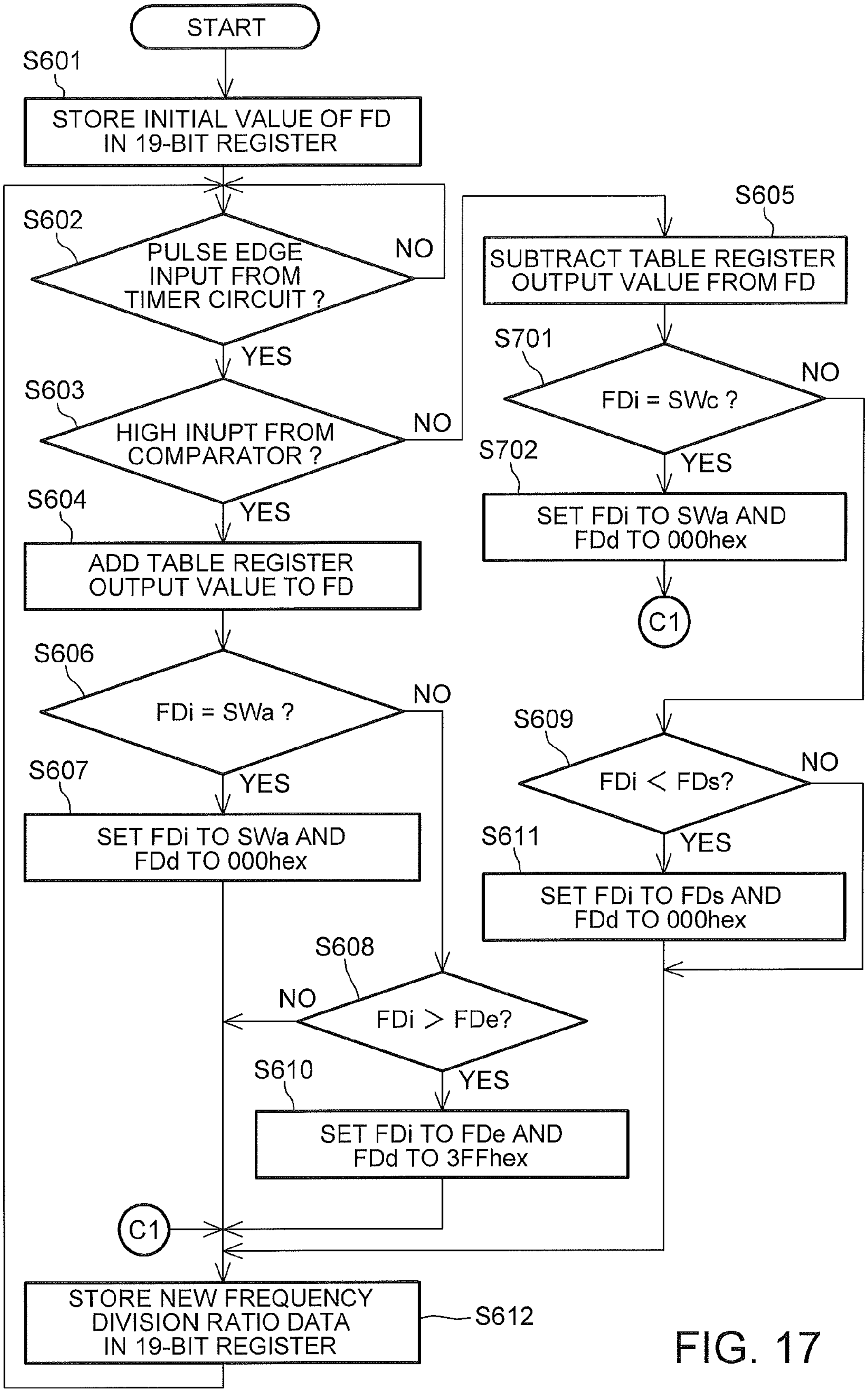
FIG. 17 is a flowchart schematically illustrating a control procedure executed by the operation unit in FIG. 15.

FIG. 17 is a flowchart schematically illustrating the control procedure used by the operation unit 508A in the second embodiment. The steps other than steps S701 and S702 are the same as steps S601 to S612 in FIG. 14. As in the first embodiment, although the procedure in FIG. 17 is shown in flowchart form, it can be implemented by hardware designed by using, for example, a hardware description language (HDL) or other logic description language.

In step S605, when the measured voltage value is equal to or greater than the target value, the operation unit 508A subtracts the output value of the table register 504 from the current 19-bit value of the frequency division ratio data FD stored in the 19-bit register 514, thereby generating new frequency division ratio data. Next, the operation unit 508A decides whether or not the value FDi of the integer part FD[18:10] of the frequency division ratio of the newly generated frequency division ratio data FD is equal to a third switchover value SWc (=C17Ahex) corresponding to switchover frequency fc (step S701). If the FDi value is not equal to the third switchover value SWc (No in step S701), the process proceeds to step S609 and continues as in the first embodiment.

If the driving frequency has increased to switchover frequency fc, however, the operation unit 508A finds that the value FDi of the integer part FD[18:10] of the frequency division ratio is equal to the third switchover value SWc (Yes in step S701). The operation unit 508A then changes the value FDi of the integer part FD[18:10] of the frequency division ratio to the first switchover value SWa (=11Chex) and changes the value FDd of the fraction part FD[9:0] to 000hex, thereby generating new frequency division ratio data (step S702). The operation unit 508A stores the newly generated frequency division ratio data FD in the 19-bit register 514 (step S612). As a result, the driving frequency jumps to the switchover frequency fa at the bottom of the first frequency range Δ1, skipping over the spurious frequencies fs1, fs2 as shown in FIG. 16.

As described above, in the driving frequency control procedure in the second embodiment, when the driving frequency downwardly exits the first frequency range Δ1 at switchover frequency fa, it jumps to a switchover frequency fb in the second frequency range Δ2b, skipping over the spurious frequencies fs1, fs2, and when the driving frequency upwardly exits the second frequency range Δ2b at switchover frequency fc, it jumps back to switchover frequency fa to reenter the first frequency range Δ1, again skipping over the spurious frequencies fs1, fs2. In this way, it is possible to avoid the spurious frequencies fs1, fs2 both when the driving frequency is reduced when it is increased. This capability can be used to ensure that the piezoelectric transducers 304K, 304Y, 304M, 304C are never driven at driving frequencies equal or close to the spurious frequencies fs1 and fs2.

In image forming on a series of sheets of recording media, the sheets are sequentially transported through the nip areas between the developers and transfer rollers. The output of driving pulses to a piezoelectric transducer is conventionally stopped from the time when one sheet leaves the relevant nip area until the next sheet arrives. Since the piezoelectric transducers are temperature-dependent, in a cold environment, their output characteristics may vary as their temperature drops during this period when they are not driven, causing printing problems.

To address this problem, in this embodiment the driving pulses are not stopped during the period from when one sheet of the recording media 110 leaves the nip area until the next sheet arrives, but the target voltage during this period is set at or near zero volts, thereby causing the driving frequency to return from the second frequency range Δ2b to the first frequency range Δ1. During this period, accordingly, the power supply outputs low voltages with small absolute values to the transfer rollers. This enables the piezoelectric transducers 304K, 304Y, 304M, 304C to be driven continuously, thereby stabilizing their operating characteristics and limiting the size of any temperature-dependent dips in their voltage boosting ratios, without having the transfer rollers draw significant quantities of developing agents onto the surface of the transfer belt 108 thence to other unwanted locations.

In addition, the switchover frequency fb to which the driving frequency is switched when being reduced differs from the switchover frequency fc from which the driving frequency is switched when increasing. If switchover frequencies fb and fc had the same value, then when the frequency corresponding to the target voltage was equal or close to this value, frequency control would tend to oscillate between the first and second frequency ranges Δ1 and Δ2b. Use of different switchover frequencies fb and fc in this embodiment prevents such oscillation.

Third Embodiment

The image forming device in the third embodiment has the same structure as the image forming device 100 in the first and second embodiments except for the configuration of the high voltage control circuit.

Figure 18:
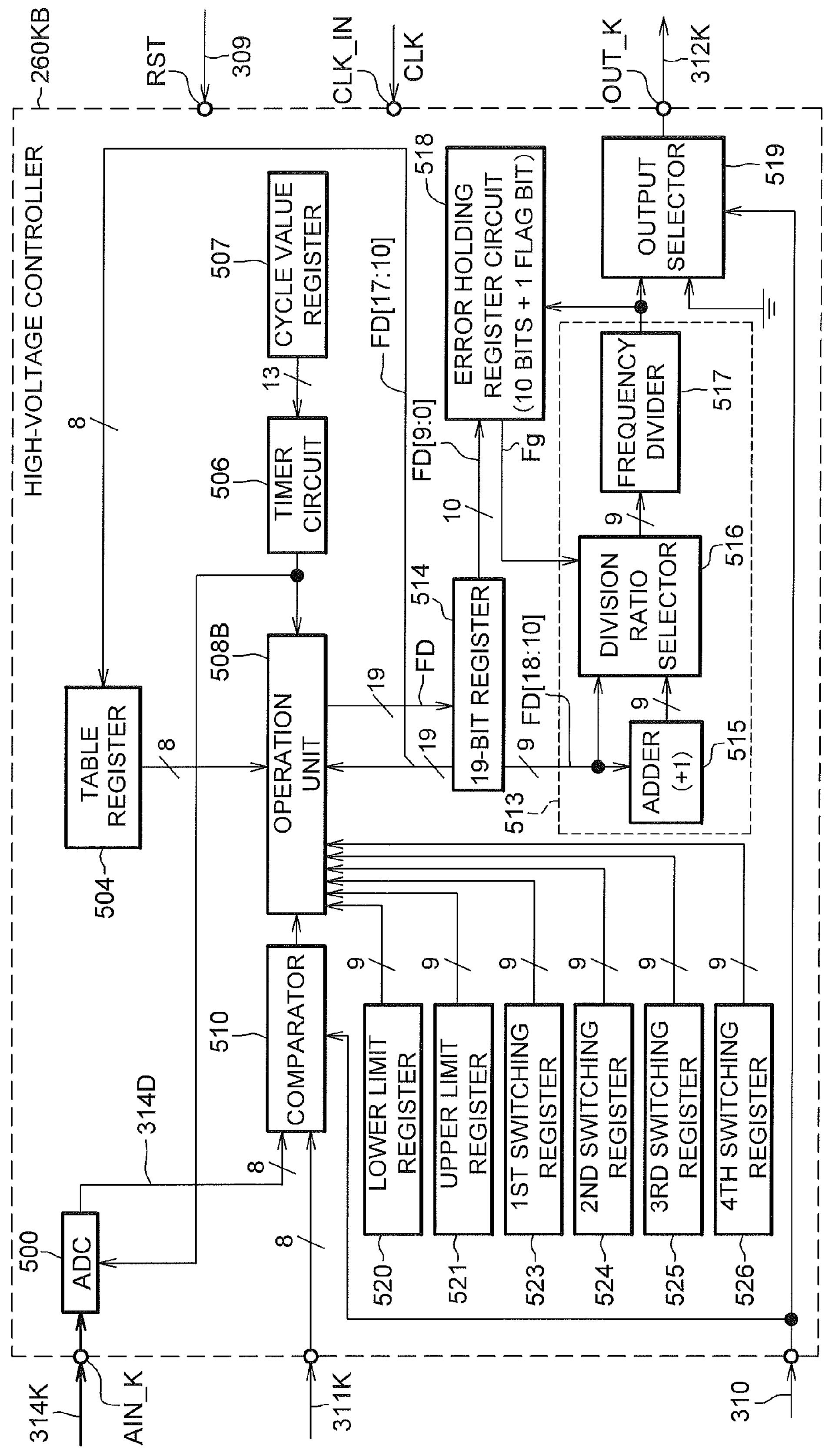
FIG. 18 is a block diagram illustrating the basic structure of the high-voltage controller in a third embodiment.
Figure 19:
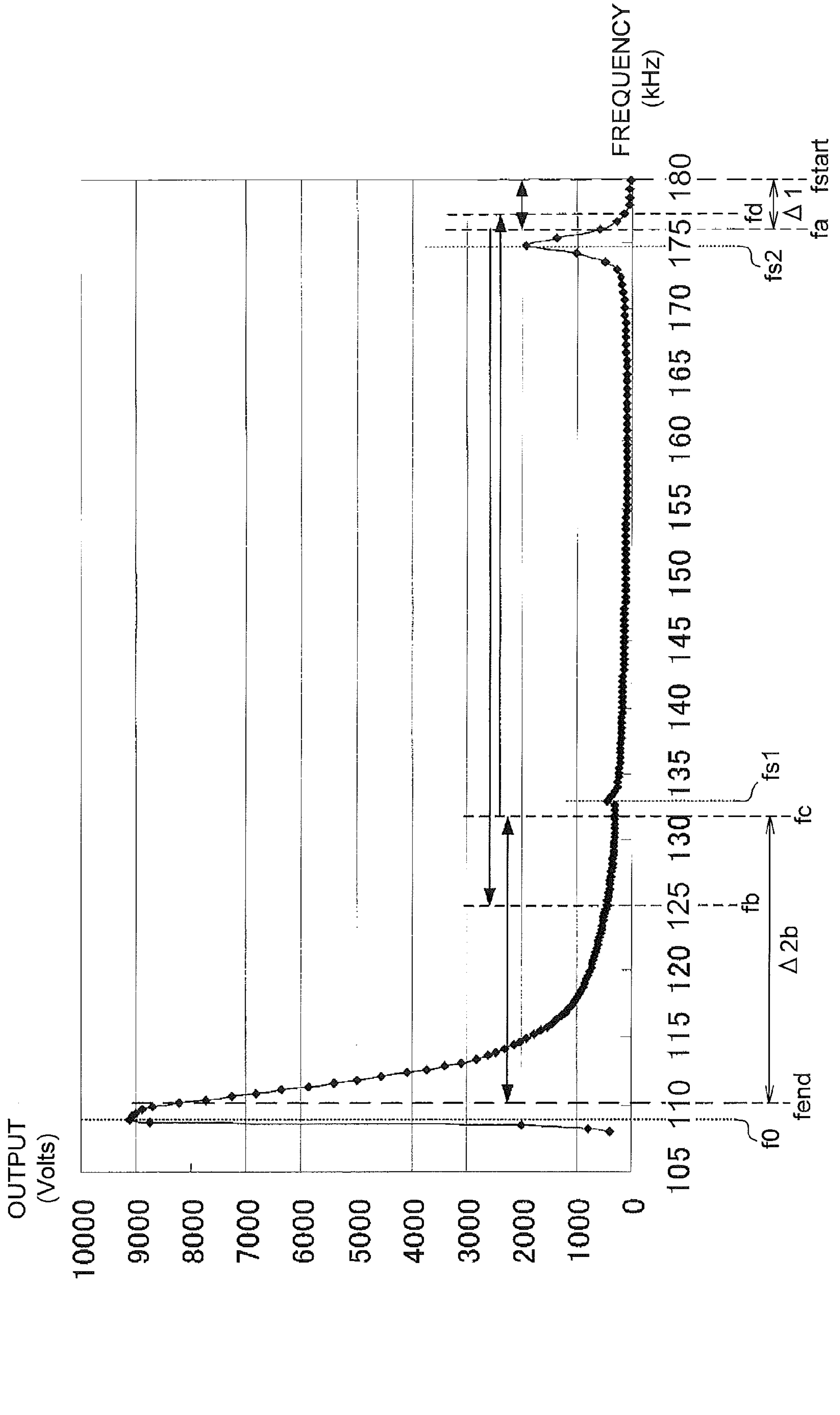
FIG. 19 is a graph illustrating an exemplary output characteristic of the piezoelectric transducer in the third embodiment.

As in the preceding embodiments, the high voltage control circuit consists of high voltage controllers, all having the same internal structure, for the colors black, yellow, magenta, and cyan. As an example, FIG. 18 illustrates the basic structure of the high-voltage controller 260KB for black images in the third embodiment. The only differences from the high-voltage controller 260KA in the second embodiment (FIG. 15) are the addition of a fourth switching register 526, and an internal modification in the operation unit 508B that causes the high voltage controller to operate as indicated by the arrows in FIG. 19. Switchover frequencies fa, fb, and fc in FIG. 19 are the same as in the second embodiment, but the first frequency range Δ1 now includes a further switchover frequency fd, higher than switchover frequency fa. Switchover frequency fd is held in the fourth switching register 526.

As in the second embodiment, when the measured voltage value represented by the digital voltage signal 314D is less than the target value (measured value<target value), the driving frequency is decreased stepwise, except that a jump is made from the lower limit fa of the first frequency range Δ1 to switchover frequency fb in the second frequency range Δ2b to skip over the spurious frequencies fs1, fs2. After the measured voltage value reaches the target value, the driving frequency is varied as necessary to make the output voltage track the target voltage.

If, while being varied in the second frequency range Δ2b, the driving frequency increases to switchover frequency fc, it then jumps to switchover frequency fd in the first frequency range Δ1, skipping over the spurious frequencies fs1, fs2. This enables the high-voltage controller 260KB to switch the target frequency freely between the first frequency range Δ1 and second frequency range Δ2b while continuing to keep the driving frequency away from the spurious frequencies fs1, fs2, as in the second embodiment.

Figure 20:
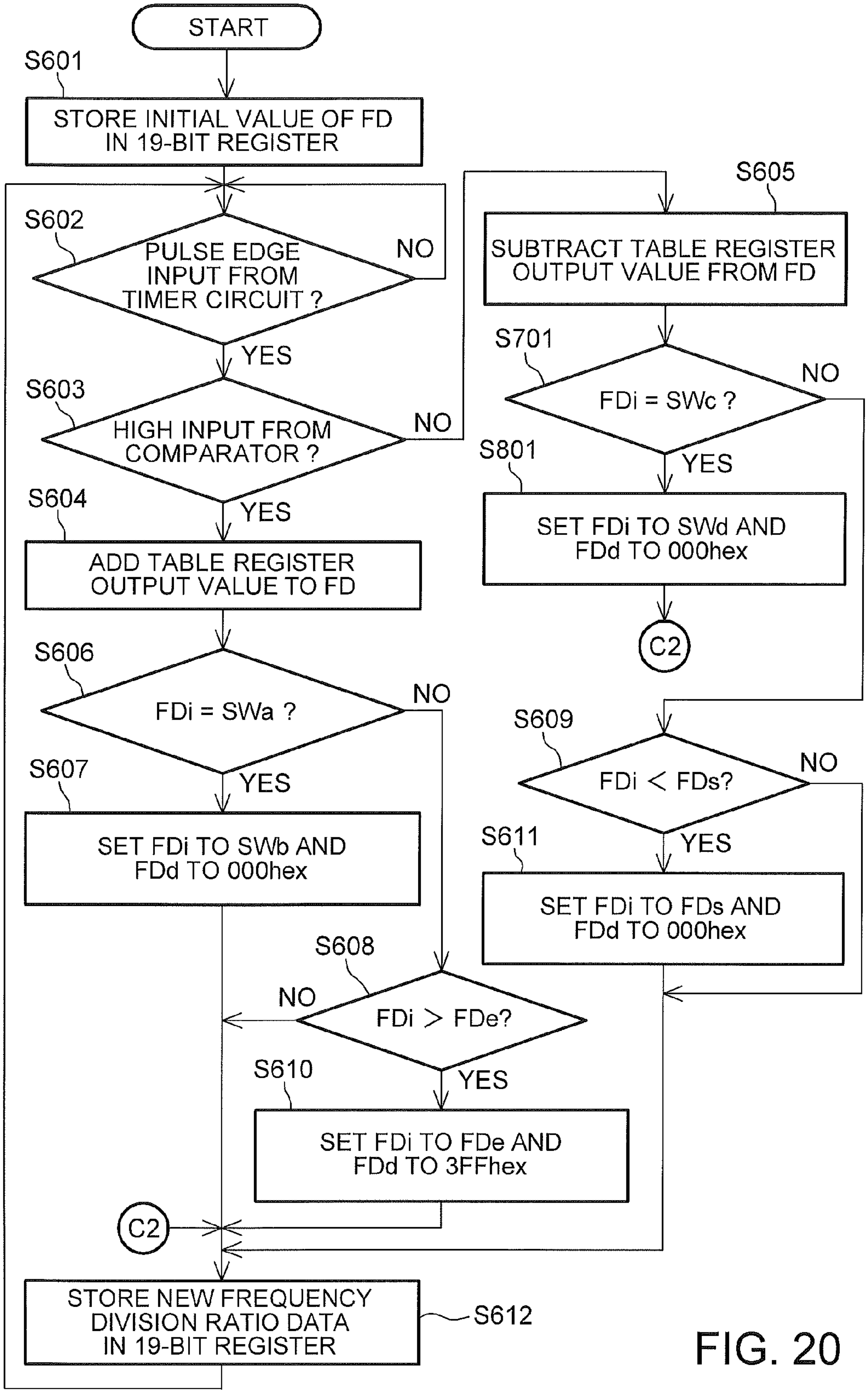
FIG. 20 is a flowchart schematically illustrating a control procedure executed by the operation unit in FIG. 18.

FIG. 20 is a flowchart schematically illustrating the control procedure used by the operation unit 508B in the third embodiment. Steps other than step S801 in FIG. 20 are the same as steps S601 to S612 and S701 in FIG. 17. As in the preceding embodiments, although the procedure in FIG. 20 is shown in flowchart form, it can be implemented by hardware designed by using, for example, a hardware description language (HDL) or other logic description language.

In the third embodiment, when the driving frequency reaches switchover frequency fc in FIG. 19 and the value FDi of the integer part FD[18:10] of the frequency division ratio becomes equal to the third switchover value SWc (Yes in step S701), the operation unit 508B sets the value FDi of the integer part FD[18:10] of the frequency division ratio to a fourth switchover value SWd (=11Ahex) and sets the value FDd of the fraction part FD[9:0] to 000hex, thereby generating new frequency division ratio data (step S702). The operation unit 508B stores the newly generated frequency division ratio data FD in the 19-bit register 514 (step S612). As a result, the driving frequency jumps to switchover frequency fd within the first frequency range Δ1 as shown in FIG. 19, skipping over the spurious frequencies fs1, fs2.

As described above, in the driving frequency control procedure in the third embodiment, the switchover frequency fa at which the driving frequency jumps from the first range to the second range is different from the switchover frequency fd to which the driving frequency changes when it jumps back to the first range. If switchover frequencies fa and fd had the same value as is the second embodiment, then when the driving frequency corresponding to the target voltage was equal or close to this value, frequency control would tend to oscillate between the first and second frequency ranges Δ1 and Δ2b. Placing two different switchover frequencies fa and fd in the first range Δ1 can reliably prevent such oscillation.

Variations

The embodiments described above are exemplary; other variations are possible. For example, in the first to third embodiment, the driving frequency changes only between a first frequency range Δ1 and a second frequency range Δ2 or Δ2b, skipping over the spurious frequencies fs1 and fs2 all at once. In one possible variation, a third frequency range is set in the valley between spurious frequencies fs1 and fs2, and the driving frequency shifts between the first and second frequency ranges in two steps, e.g., first from the first frequency range to the third frequency range, and then from the third frequency range to the second frequency range, skipping over the spurious frequencies fs1, fs2 one at a time. Similarly, if there are three or more spurious frequencies, the driving frequency may skip over them in N steps, where N is equal to or greater than three.

Although the image forming devices in the preceding embodiments are of the color tandem type, the novel high voltage power source is also applicable to monochrome image forming devices. Uses of the novel high voltage power source are not limited to the generation of transfer bias voltages; it can also be used as a bias source for other image forming processes such as charging and developing.

The structure of the high-voltage control circuit 260 may be partially or entirely implemented either in hardware, as shown in the drawings, or in software, as a program executed by a processor such as a central processing unit (CPU). The high-voltage control circuit 260 may furthermore be implemented in an application specific integrated circuit (ASIC) having functional units configured by the integrated circuit manufacturer for specific uses, or a field programmable gate array (FPGA) having logic circuits configurable by the manufacturer of the image forming apparatus or its power supply.

Those skilled in the art will recognize that further variations are possible within the scope of the invention, which is defined in the appended claims.

What is claimed is:

1. A power supply comprising:

a piezoelectric transducer having a prescribed resonant frequency and a spurious frequency higher than the prescribed resonant frequency, for converting an input alternating current voltage to a converted voltage;

a driving circuit for generating the alternating current voltage input to the piezoelectric transducer, the driving circuit operating with a driving frequency equal to a frequency of the alternating current voltage;

a voltage output unit for generating an output voltage from the converted voltage;

a voltage detection unit for detecting the output voltage and outputting a detected voltage value; and a frequency control unit for controlling the driving frequency of the driving circuit by performing a digital operation on the detected voltage value, wherein the frequency control unit varies the driving frequency in a prescribed first frequency range having a lower limit at a frequency that is higher than the spurious frequency and in a prescribed second frequency range having an upper limit at a first switchover frequency that is lower than the spurious frequency but higher than the prescribed resonant frequency of the piezoelectric transducer, and wherein the frequency control unit changes the driving frequency from the prescribed first frequency range to the first switchover frequency in the prescribed second frequency range when the driving frequency reaches the lower limit of the prescribed first frequency range as the output voltage is being raised, thereby skipping over a prescribed third frequency range between the lower limit of the prescribed first frequency range and the switchover frequency, the prescribed third frequency range including the spurious frequency.

2. The power supply of claim 1, wherein a further frequency range has a lower limit at the first switchover frequency and an upper limit at a second switchover frequency that is lower than the spurious frequency, and wherein, when the driving frequency becomes equal to the second switchover frequency in the further frequency range, the frequency control unit changes the driving frequency to a predetermined switchover frequency in the prescribed first frequency range, skipping over the prescribed third frequency range including the spurious frequency.

3. The power supply of claim 2, wherein the predetermined switchover frequency of the prescribed first frequency range is equal to the lower limit of the prescribed first frequency range.

4. The power supply of claim 2, wherein the predetermined switchover frequency of the prescribed first frequency range is higher than the lower limit of the prescribed first frequency range.

5. The power supply of claim 1, wherein the frequency control unit starts controlling the driving frequency by setting the driving frequency to an upper limit of the prescribed first frequency range.

6. The power supply of claim 1, wherein the frequency control unit comprises a register for storing data representing the first switchover frequency.

7. The power supply of claim 2, wherein the frequency control unit comprises registers for storing data representing the second switchover frequency and data representing the predetermined switchover frequency.

8. The power supply of claim 1, wherein:

the prescribed third frequency range is one of a plurality of prescribed third frequency ranges between the lower limit of the prescribed first frequency range and the upper limit of the prescribed second frequency range; and the frequency control unit changes the driving frequency between the prescribed first frequency range and the prescribed second frequency range in one or more steps, skipping over the plurality of prescribed third frequency ranges individually.

9. The power supply of claim 1, wherein the frequency control unit comprises:

a pulse generating circuit for generating a driving pulse with a switching frequency corresponding to the driving frequency, wherein the driving circuit includes a switching element for generating the alternating current voltage by a switching operation responsive to the driving pulse.

10. The power supply of claim 9, wherein:

the pulse generating circuit generates the driving pulse by dividing a reference clock signal on the basis of an N-bit value (where N is an integer equal to or greater than two) designated by the frequency control unit; and the frequency control unit changes the driving frequency by changing the N-bit value.

11. The power supply of claim 10, wherein the frequency control unit further comprises an error holding circuit for accumulating a value of M low order bits of the N-bit value, M being a positive integer less than N, and storing the accumulated value as an error;

wherein the pulse generating circuit divides the reference clock signal by using a value of K high order bits of the N-bit value, N being a sum of K and M, and temporarily increases the value of the K high order bits when the error exceeds a threshold value; and wherein the error holding circuit changes the error to a value less than the threshold value when the error exceeds the threshold value.

12. The power supply of claim 11, wherein the value of the K high order bits is used as a frequency division ratio.

13. The power supply of claim 11, wherein:

the error holding circuit causes the error to overflow when the error exceeds the threshold value; and the pulse generating circuit temporarily increases the value of the K high order bits in response to the overflow of the error.

14. The power supply of claim 1, wherein the driving circuit comprises a comparator for comparing the detected voltage value and a target value corresponding to the target voltage and outputting a comparison result to the frequency control unit, and wherein, on a basis of the comparison result, the frequency control unit varies the driving frequency in a direction that causes the output voltage to track the target voltage.

15. An image forming device comprising:

an image forming unit; and a power supply for generating an output voltage and supplying the output voltage to the image forming unit, wherein the power supply comprises:

a piezoelectric transducer having a prescribed resonant frequency and a spurious frequency higher than the prescribed resonant frequency, for converting an input alternating current voltage to a converted voltage;

a driving circuit for generating the alternating current voltage input to the piezoelectric transducer, the driving circuit operating with a driving frequency equal to a frequency of the alternating current voltage;

a voltage output unit for generating the output voltage from the converted voltage;

a voltage detection unit for detecting the output voltage and outputting a detected voltage value; and a frequency control unit for controlling the driving frequency of the driving circuit by performing a digital operation on the detected voltage value, wherein the frequency control unit varies the driving frequency in a prescribed first frequency range having a lower limit at a frequency that is higher than the spurious frequency and in a prescribed second frequency range having an upper limit at a first switchover frequency that is lower than the spurious frequency but higher than the prescribed resonant frequency of the piezoelectric transducer, and wherein the frequency control unit changes the driving frequency from the prescribed first frequency range to the first switchover frequency in the prescribed second frequency range when the driving frequency reaches the lower limit of the first frequency range when the output voltage is being raised, thereby skipping over a prescribed third frequency range between the lower limit of the prescribed first frequency range and the switchover frequency, the prescribed third frequency range including the spurious frequency.

16. The image forming device of claim 15, wherein a further frequency range has a lower limit at the first switchover frequency and an upper limit at a second switchover frequency that is lower than the spurious frequency, and wherein, when the driving frequency becomes equal to the second switchover frequency in the further frequency range, the frequency control unit changes the driving frequency to a predetermined switchover frequency in the prescribed first frequency range, skipping over the prescribed third frequency range including the spurious frequency.

17. A method of controlling a piezoelectric transducer having a prescribed resonant frequency and a spurious frequency higher than the prescribed resonant frequency, to convert an input alternating current voltage to a converted voltage, in a power supply including the piezoelectric transducer, a driving circuit for generating the input alternating current voltage for the piezoelectric transducer, the driving circuit operating with a driving frequency equal to a frequency of the alternating current voltage, a voltage output unit for generating an output voltage from the converted voltage, a voltage detection unit for detecting the output voltage and outputting a detected voltage value, and a frequency control unit for controlling the driving frequency by performing a digital operation on the detected voltage value, the method comprising:

varying the driving frequency in a prescribed first frequency range having a lower limit at a frequency that is higher than the spurious frequency and in a prescribed second frequency range having an upper limit at a first switchover frequency that is lower than the spurious frequency but higher than the prescribed resonant frequency of the piezoelectric transducer to make the output voltage track a target value;

deciding whether or not the driving frequency has reached the lower limit of the prescribed first frequency range as the output voltage of the piezoelectric transducer is being raised; and changing the driving frequency from the prescribed first frequency range to the first switchover frequency in the prescribed second frequency range when the driving frequency reaches the lower limit of the prescribed first frequency range, thereby skipping over a prescribed third frequency range including the spurious frequency.

18. The method of claim 17, wherein a further frequency range has a lower limit at the first switchover frequency and an upper limit at a second switchover frequency that is lower than the spurious frequency, and wherein the method further comprises:

deciding whether or not the driving frequency is equal to the second switchover frequency in the further frequency range; and changing the driving frequency to a predetermined switchover frequency in the prescribed first frequency range, skipping over the prescribed third frequency range including the spurious frequency, when the driving frequency is equal to the second switchover frequency in the further frequency range.

* * * * *